US010933899B2

(12) United States Patent
Harrison et al.

(10) Patent No.: US 10,933,899 B2
(45) Date of Patent: Mar. 2, 2021

(54) SHOPPING CART BASKET WITH FORWARD HANDLE

(71) Applicant: Unarco Industries LLC, Wagoner, OK (US)

(72) Inventors: William Timothy Harrison, Muskogee, OK (US); Gregory Eric Dallen, Broken Arrow, OK (US); Wesley McMurtrey, Bixby, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

(21) Appl. No.: 16/746,252

(22) Filed: Jan. 17, 2020

(65) Prior Publication Data

US 2020/0148245 A1    May 14, 2020

Related U.S. Application Data

(63) Continuation-in-part of application No. 16/242,100, filed on Jan. 8, 2019, now Pat. No. 10,556,609.

(60) Provisional application No. 62/615,274, filed on Jan. 9, 2018.

(51) Int. Cl.
*B62B 5/06* (2006.01)

(52) U.S. Cl.
CPC .................... *B62B 5/061* (2013.01)

(58) Field of Classification Search
CPC .. B62B 3/14; B62B 5/06; B62B 5/061; B62B 5/0006; B62D 7/20
See application file for complete search history.

(56) References Cited

U.S. PATENT DOCUMENTS

| 2,890,057 | A | 6/1959 | Davis |
| 2,906,542 | A | 9/1959 | Hoedinghaus et al. |
| 2,931,662 | A | 4/1960 | Young |
| 3,195,912 | A | 7/1965 | Howard |
| D283,264 | S | 4/1986 | Levy-Joseph |
| D294,419 | S | 2/1988 | Rehrig |
| 5,131,669 | A * | 7/1992 | Kinnamon ............ B62B 5/0006 280/33.992 |
| 6,749,204 | B2 | 6/2004 | Werner |
| 7,063,337 | B2 | 6/2006 | Russell et al. |
| D530,478 | S | 10/2006 | Splain et al. |
| 7,121,562 | B2 * | 10/2006 | O'Quin ................ B62B 5/0006 280/33.992 |
| 7,168,711 | B2 * | 1/2007 | Ondrasik ............. B62B 3/1404 280/33.991 |
| D546,021 | S | 7/2007 | Splain et al. |

(Continued)

*Primary Examiner* — Bryan A Evans
(74) *Attorney, Agent, or Firm* — Arnold & Porter Kaye Scholer

(57) ABSTRACT

A shopping cart basket having a handle region located at the front or the sides of the shopping cart basket is disclosed. The forward handle region may have a plurality of openings along the front, corners, and sides to allow a customer to easily grip the shopping cart basket and guide the shopping cart. The shopping cart basket may be formed from a metallic wire portion and a non-metallic forward handle region, or in some embodiments, the shopping cart basket may be formed from a fully formed from a polymer material. The shopping cart may also include non-metallic corner inserts that form a portion of the side and front walls of the shopping cart as well as a non-metallic bottom insert that forms a portion of the bottom wall of the shopping cart.

18 Claims, 26 Drawing Sheets

(56) References Cited

U.S. PATENT DOCUMENTS

| | | |
|---|---|---|
| D550,423 S | 9/2007 | Splain et al. |
| D556,413 S | 11/2007 | Splain et al. |
| 7,384,049 B2 | 6/2008 | Peota et al. |
| 7,416,194 B2 | 8/2008 | Splain et al. |
| D591,474 S | 4/2009 | Peota et al. |
| 7,600,763 B2 | 10/2009 | Splain et al. |
| 7,766,347 B2 | 8/2010 | Ryan et al. |
| 7,793,948 B2 | 9/2010 | Splain et al. |
| D628,759 S | 12/2010 | Walter |
| 7,959,166 B2 | 6/2011 | Splain et al. |
| D644,810 S | 9/2011 | Peota et al. |
| D646,041 S | 9/2011 | Berthiaume et al. |
| 8,056,909 B2 * | 11/2011 | Burdwood ............ B62B 3/1404 280/33.991 |
| 8,096,564 B2 | 1/2012 | Berthiaume et al. |
| 8,469,373 B2 | 6/2013 | Berthiaume et al. |
| 8,684,371 B2 * | 4/2014 | Berthiaume ........ B29C 45/1704 280/33.991 |
| D802,868 S | 11/2017 | Sherman et al. |
| D802,869 S | 11/2017 | Sherman et al. |
| D818,237 S | 5/2018 | Walter et al. |
| D821,049 S | 6/2018 | Lazzarino et al. |
| 2002/0135144 A1 | 9/2002 | Murar et al. |
| 2003/0057666 A1 | 3/2003 | Murar et al. |
| 2004/0046341 A1 | 3/2004 | Wilkinson |
| 2007/0063461 A1 | 3/2007 | Peota et al. |
| 2007/0063464 A1 | 3/2007 | Splain et al. |
| 2009/0160146 A1 * | 6/2009 | Berthiaume ........ B29C 45/1704 280/33.992 |
| 2011/0140380 A1 * | 6/2011 | Ulrich ................... B62B 5/0096 280/33.992 |
| 2012/0304440 A1 | 12/2012 | Berthiaume et al. |
| 2013/0300076 A1 | 11/2013 | Berthiaume et al. |
| 2019/0210625 A1 | 7/2019 | Harrison |

\* cited by examiner

SHOPPING CART BASKET WITH FORWARD HANDLE

CROSS-REFERENCE TO RELATED APPLICATIONS

This application is a continuation-in-part of U.S. patent application Ser. No. 16/242,100 filed on Jan. 8, 2019, which claims priority to U.S. Provisional Patent Application No. 62/615,274 filed on Jan. 9, 2018. The above referenced applications are incorporated by reference in their entirety.

FIELD OF THE INVENTION

This disclosure relates to baskets for shopping carts for grocery stores and the like and shopping carts.

BACKGROUND

At present, the American-market, adult, full-size, wire-made shopping cart has a distinctive construction of a frame, casters, basket, hinged back gate and child seat.

The frame is composed of a chassis and a handle, made up of multiple, bent steel tubes, and sits atop four casters, the rear two of which track forward and back, and the front two of which swivel. A lower shelf of wire lies between the lower side rails of the chassis. The frame handle rises in the back from the chassis to form the "driver's" "steering mechanism." The basket is see-through and mounts atop the frame, forward of the handle. A hinged back gate with a folding child seat completes the basket and allows the carts to nest with each other in the manner familiar to all shoppers in stores with carts.

While the frame handle is mounted at the rear of the shopping cart, a means to allow the customer to easily grasp the shopping cart from the front to provide an alternate means of propelling the shopping cart would be helpful.

BRIEF SUMMARY

This disclosure may relate to a shopping cart that includes: a frame including a rear handle and a chassis connected to four casters, a shopping cart basket attached to the frame, where the shopping cart basket may have a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall. The shopping cart basket may include a wire basket portion formed from a plurality of metallic wires that includes a bottom wire mesh region that forms a portion of the bottom wall, a forward handle positioned on an uppermost wire of the wire basket portion and forming an upper portion of the shopping cart basket along with front wall and a portion of the first and second side walls, and a bottom insert forming a forward region of the bottom wall that extends rearward from the front wall to the bottom wire mesh region. The forward handle and the bottom insert may be formed from a non-metallic material. The shopping cart basket may further include a first corner insert that extends from the front wall to the first side wall, and a second corner insert that extends from the front wall to the second side wall, where the first corner insert and the second corner insert are formed from a non-metallic material. The forward handle may also include a main body portion positioned along the front wall of the shopping cart basket, a first side arm that extends from the main body portion along the first side wall of the shopping cart basket, and a second side arm that extends from the main body portion along the second side wall of the shopping cart basket. The main body portion may have a pair of front openings. The forward handle may also have a recess along a bottom surface of the forward handle that receives an uppermost wire of the wire basket portion. The first corner insert and the second corner insert may extend from the bottom insert to the forward handle. The first corner insert may have an outward facing surface that extends from the first side wall to the front wall, where the outward facing may have a rounded shape. The bottom insert may have a plurality of rear tabs that engage a forwardmost horizontal wire of the bottom wire mesh region. The bottom insert may also have a front surface, a rear surface opposite the front surface, a top surface extending between the front surface to the rear surface, a bottom surface opposite the top surface, a pair of side surfaces, and a pair of corner surfaces, where a forwardmost edge of each corner surface is located forward of the front surface. The bottom surface of the bottom insert may be positioned on top of a portion of the plurality of wires that extend from the front end to the rear end of the wire basket portion. The bottom insert may include forward tabs extending from the front surface that engage a perimeter wire of the plurality of wires that form the wire basket portion, where the perimeter wire extends across the front wall of the plurality of wires that form the wire basket portion.

Other aspects of this disclosure may relate to a shopping cart that includes: a frame including a rear handle and a chassis connected to four casters, a shopping cart basket attached to the frame, where the shopping cart basket has a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall. The shopping cart basket may include: a wire basket portion formed from a plurality of metallic wires that includes a bottom wire mesh region that forms a portion of the bottom wall, a forward handle positioned on an uppermost wire of the wire basket portion and forming an upper portion of the shopping cart basket along with front wall and a portion of the first and second side walls, and a first corner insert that extends from the front wall to the first side wall. The forward handle and the first corner insert may be formed from a non-metallic material. The shopping cart basket may further include a second corner insert that extends from the front wall to the second side wall, and where the second corner insert may be formed from a non-metallic material. A bottom insert may form a forward region of the bottom wall that extends rearward from the front wall to the bottom wire mesh region, and where the bottom insert may be formed from a non-metallic material. The first corner insert may engage the bottom insert at a first end and may also engage the forward handle at a second end opposite the first end. The first corner insert may have an outward facing surface and an inward facing surface opposite the outward facing surface, where the inward facing surface includes a plurality of substantially horizontal grooves. Each groove of the plurality of grooves may receive a perimeter wire of the plurality of wires that form the wire basket portion, where the perimeter wire extends across the front wall of the plurality of wires that form the wire basket portion. The first corner insert may have an outward facing surface that extends from the first side wall to the front wall, where the outward facing may have a radius within a range of 8 centimeters and 15 centimeters.

Still additional aspects of this disclosure may relate to a shopping cart including: a frame including a rear handle and a chassis connected to four casters, a shopping cart basket attached to the frame, where the shopping cart basket comprises a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall. The shopping cart basket may include: a wire basket portion formed from a plurality of metallic wires that includes a bottom wire mesh region that forms a portion of the bottom wall, a forward handle positioned on an uppermost wire of the wire basket portion and forming an upper portion of the shopping cart basket along the front wall and a portion of the first and second side walls, wherein the forward handle includes a main body portion positioned along the front wall of the shopping cart basket, a first side arm that extends from the main body portion along the first side wall of the shopping cart basket, and a second side arm that extends from the main body portion along the second side wall of the shopping cart basket, and wherein the main body portion includes a pair of front openings; a first corner insert that extends from the front wall to the first side wall; a second corner insert that extends from the front wall to the second side wall; and a bottom insert forming a forward region of the bottom wall that extends rearward from the front wall to the bottom wire mesh region. The forward handle, the first corner insert, the second corner insert, and the bottom insert may be formed from a non-metallic material. The first corner insert may engage the bottom insert at a first end and also engage the forward handle at a second end opposite the first end. The bottom insert may include a plurality of rear tabs that engage a forwardmost horizontal wire of the bottom wire mesh region. The bottom insert may also include a front surface, a rear surface opposite the front surface, a top surface extending between the front surface to the rear surface, a bottom surface opposite the top surface, a pair of side surfaces, and a pair of corner surfaces, wherein a forwardmost edge of each corner surface is located forward of the front surface.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
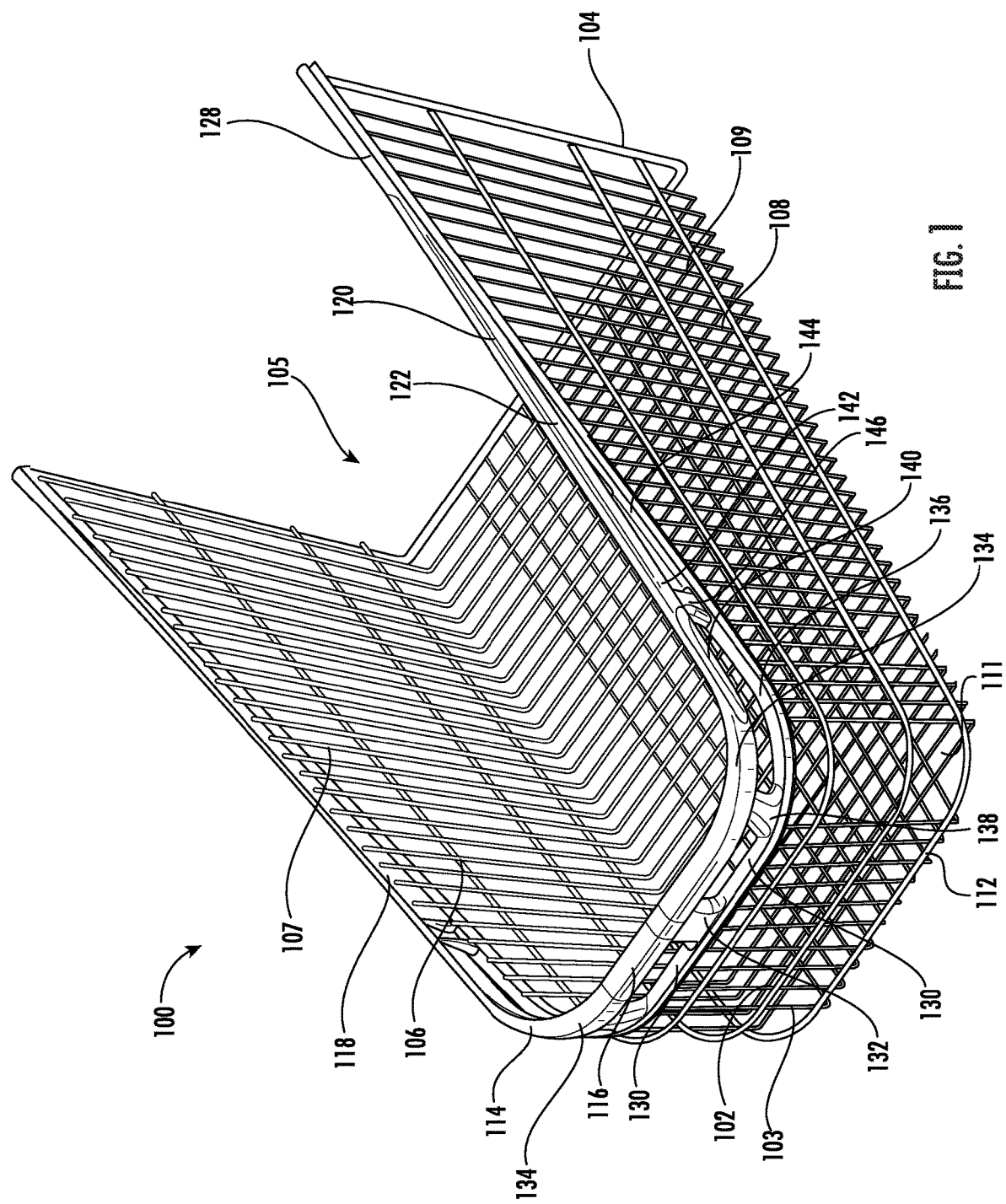
FIG. 1 illustrates a top front perspective view of an embodiment of a shopping cart basket as disclosed herein.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "proximal," "distal," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention, unless explicitly specified by the claims. Further, "providing" an article, as used herein, refers broadly to making an article available or accessible for future actions to be performed on the article, and does not connote that the party providing the article has manufactured, produced, or supplied the article or that the party providing the article has ownership or control of the article. The reader is also advised that the attached drawings are not necessarily drawn to scale.

In general, this disclosure relates to a shopping cart basket having a forward handle region to allow a customer to easily grip and pull a shopping cart.

FIGS. 1-7 illustrate an embodiment of a shopping cart basket 100 having a hybrid type construction meaning that the shopping cart basket 100 may be made from multiple components such as having a wire basket region 112 formed from a metallic component that forms the lower portion of the shopping cart basket 100 and a forward handle region 114 formed from a non-metallic or polymer component that forms the upper portion of the shopping cart basket 100. The shopping cart basket 100 comprises a front side or front end 102, a rear side or rear end 104 opposite the front end 102, a left side 106, a right side 108, and a bottom side 110. The shopping cart basket may include a front wall 103 on the front end 102, a rear opening 105 on the rear end 104 opposite the front wall 103, a left side wall 107 extending between the front wall 103 and the rear end 104, a right side wall 109 extending between the front wall 103 and the rear end 104 opposite the left side wall 107, and a bottom wall 111 extending between the front wall 103, the left side wall 107, and the right side wall 109. The handle region 114 may comprise a main body portion 116 positioned along the top of the front side 102 of the basket 100 with a pair of arms 118, 120 extending from each end of the main body portion 116 and extending along the top of both the left side 106 and the right side 108 of the shopping cart basket 100. Each of the arms 118, 120 may extend up the entire length of the left side 106 and right side 108 respectively of the shopping cart basket 100. Alternatively, each of the arms 118, 120 may extend up the majority of the length of the left side 106 and right side 108 respectively of the shopping cart basket 100. In addition, the forward handle region 114 may be symmetrical around a plane extending in a vertical direction through a midpoint of the main body portion 116.

Figure 2:
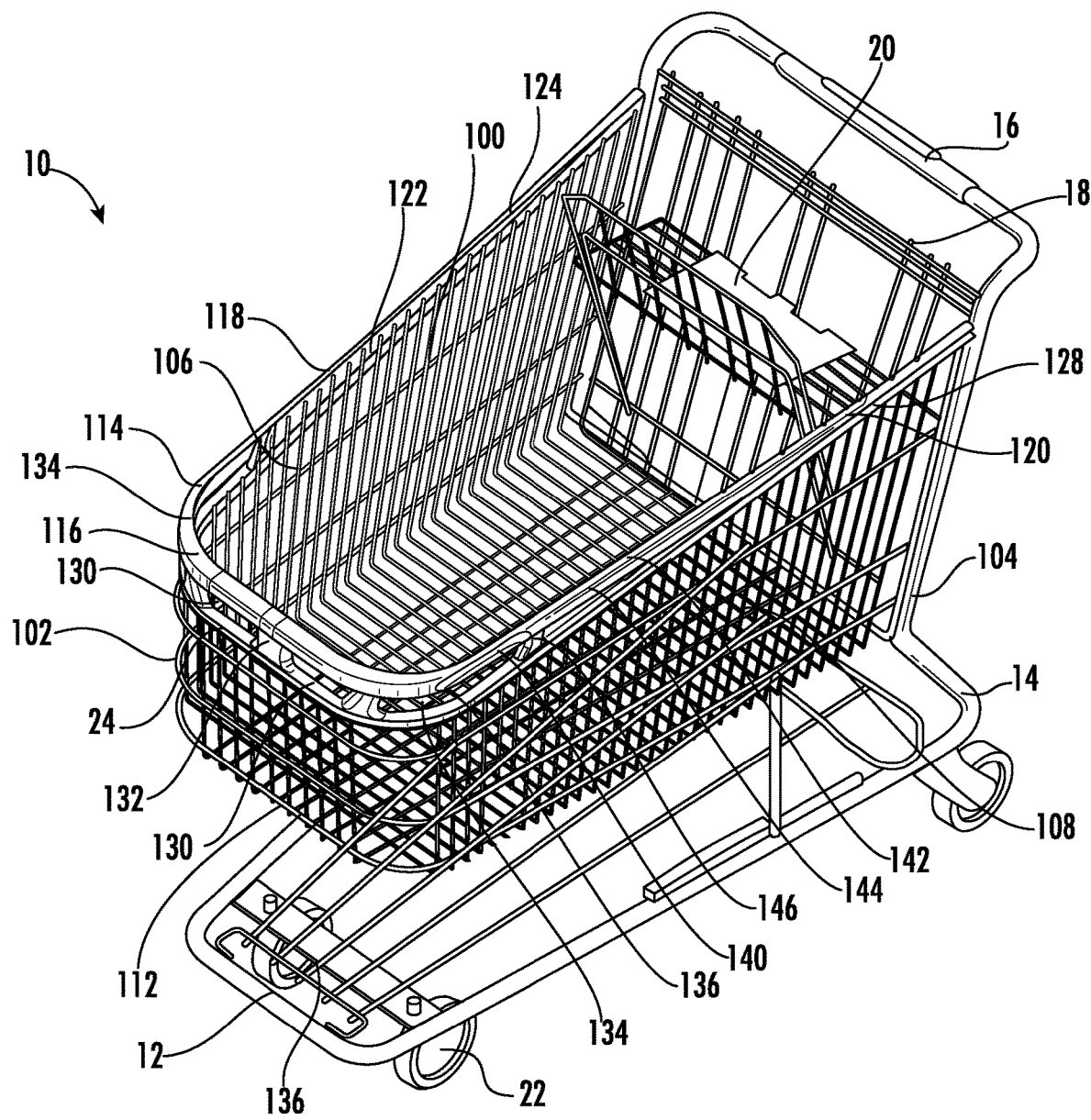
FIG. 2 illustrates a top front perspective view of an embodiment of a shopping cart having a shopping cart basket shown in FIG. 1 as disclosed herein.
Figure 3:
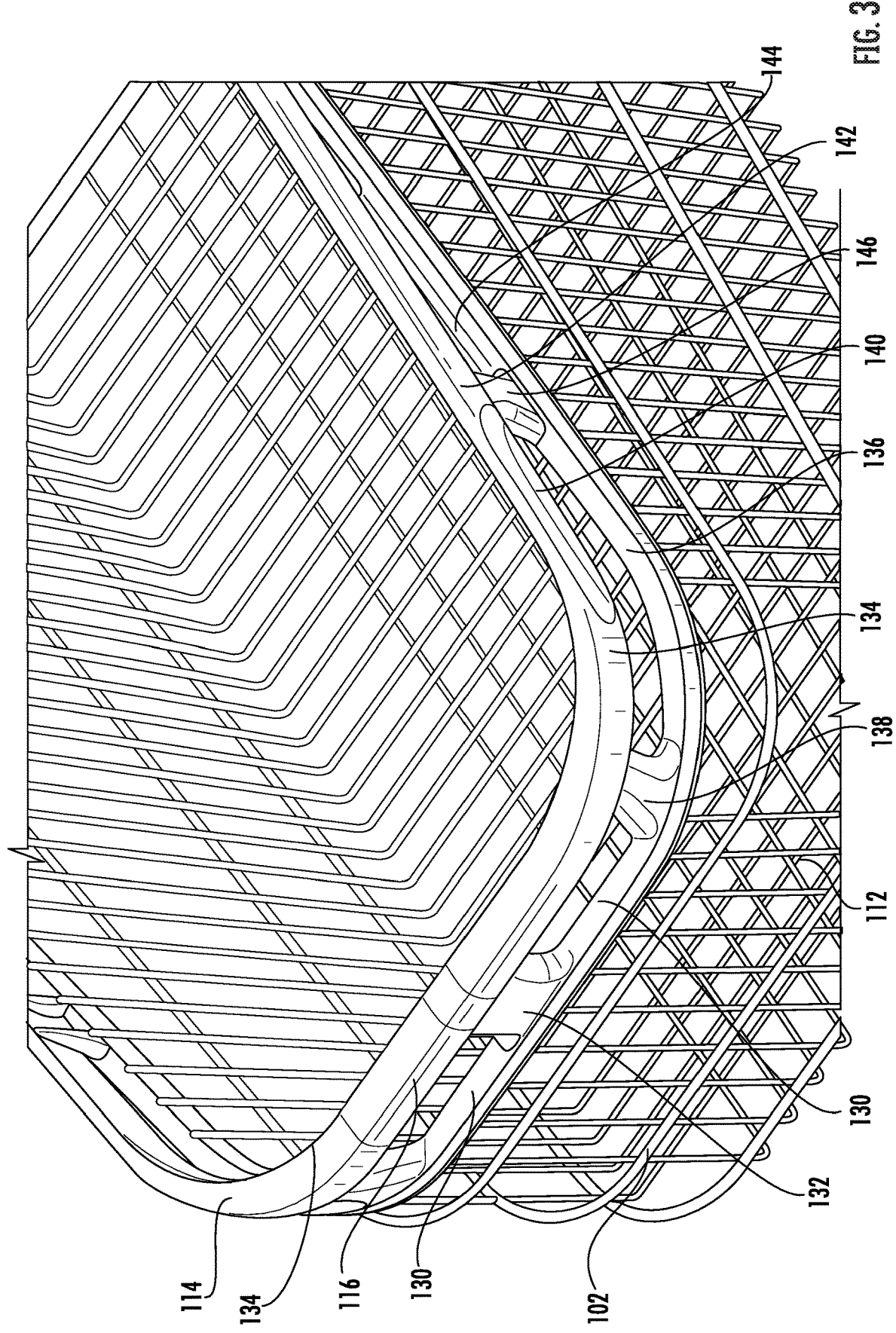
FIG. 3 illustrates an enlarged view of the front portion of the perspective view of the shopping cart basket shown in FIG. 1.
Figure 4:
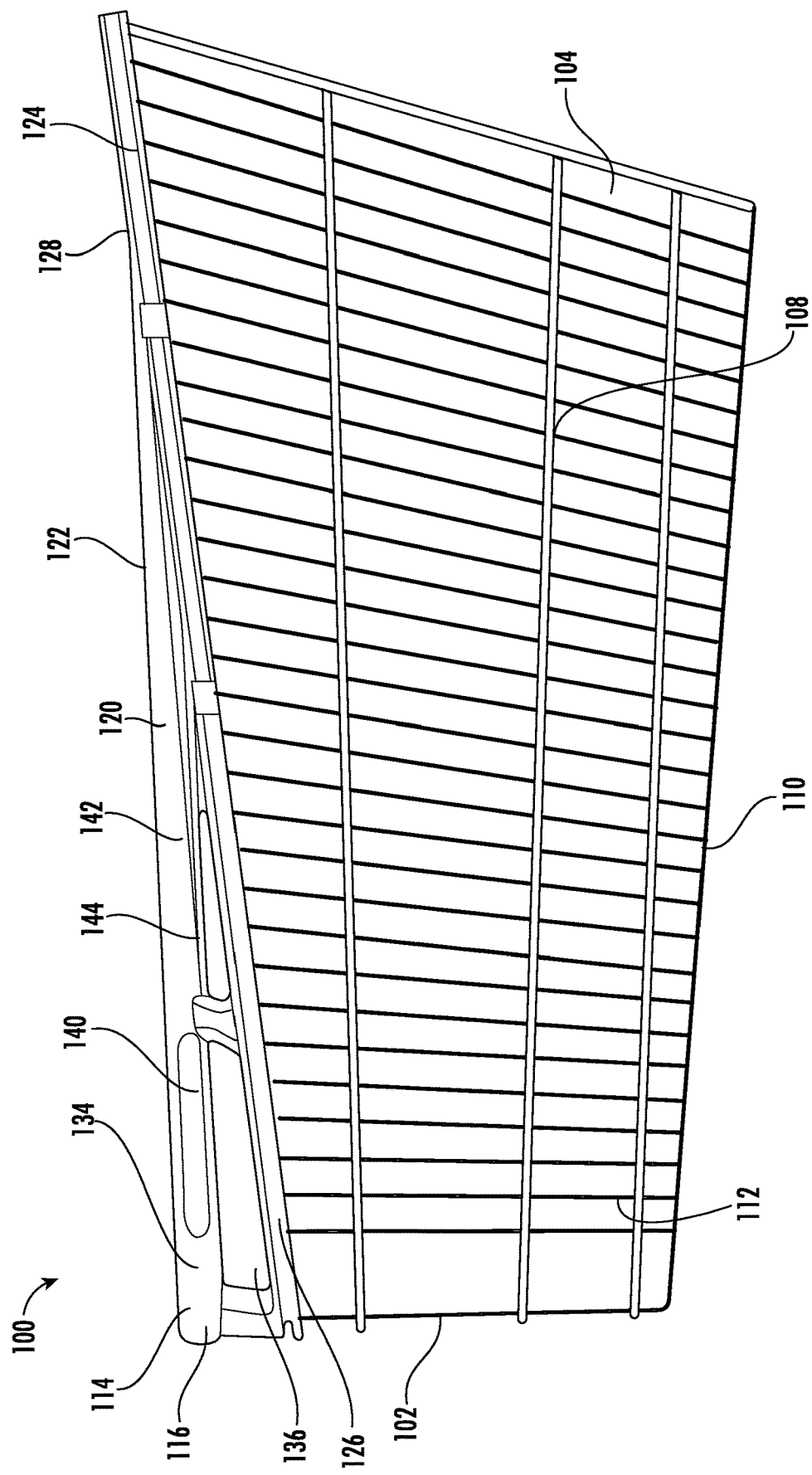
FIG. 4 illustrates a side view of the shopping cart basket of the embodiment shown in FIG. 1 as disclosed herein.
Figure 5:
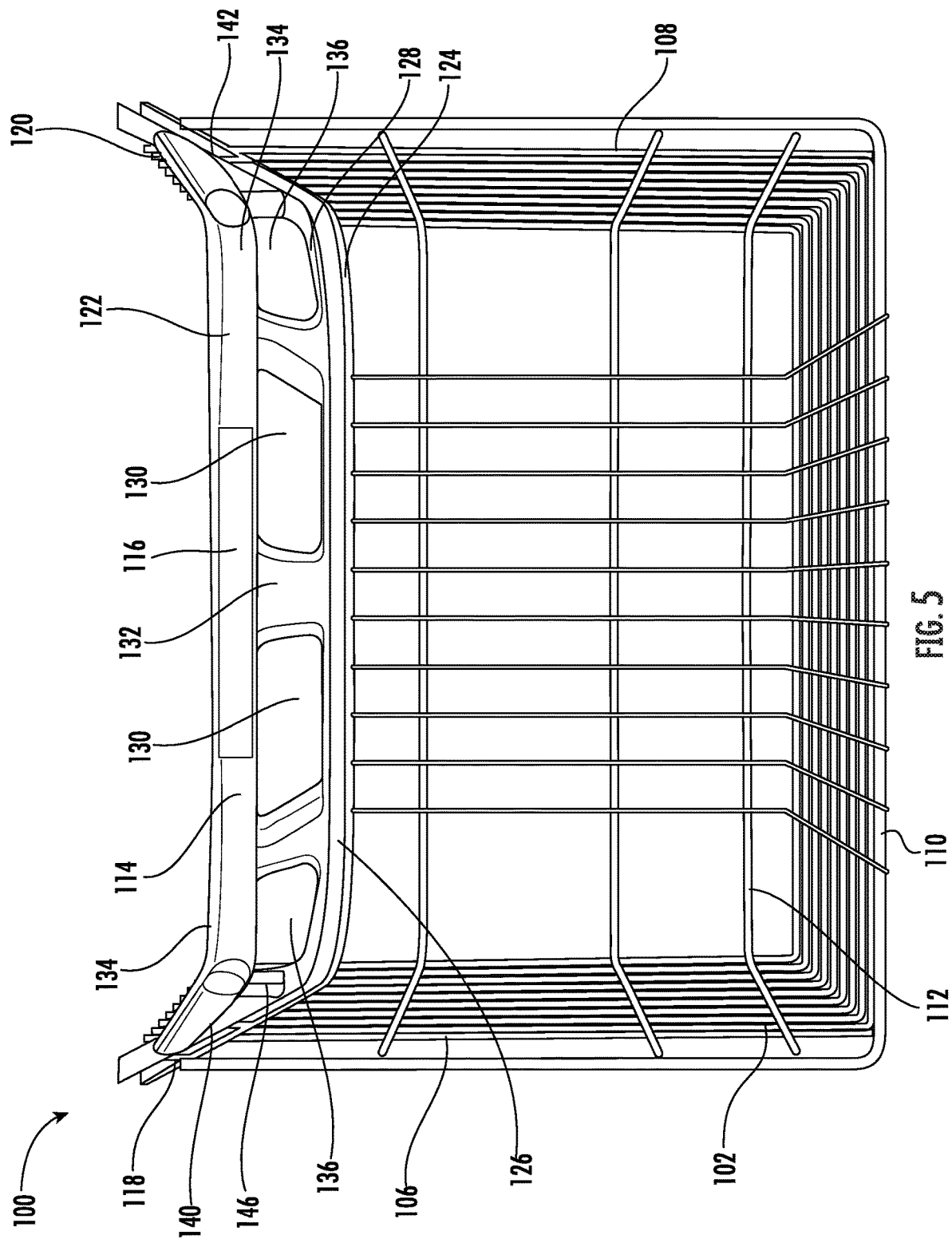
FIG. 5 illustrates a front view of the shopping cart basket of the embodiment shown in FIG. 1 as disclosed herein.

FIG. 2 illustrates a shopping cart 10 with the shopping cart basket 100 installed on a frame 12 that is comprised of a chassis 14 and a handle 16, where the chassis sits atop four casters 22. A hinged back gate 18 with a folding child seat 20 complete the shopping cart 10 and allows the carts to nest with each other in the manner familiar to all shoppers in stores with shopping carts 10.

The forward handle region 114 may include an upper surface 122 that forms the overall upper surface of the shopping cart basket 100. In addition, the handle region 114 may include a lower surface 124 that engages and secures the handle region 114 to a top of the wire basket region 112. In addition, a groove 126 may extend along an entire length of the handle region 114, where the groove 126 extends along from an end of arm 118 near the rear side 104 to the front side 102 along the main body portion 116 and then along the arm 120 back towards the rear side 104. The groove 126 may be positioned between the lower surface 124 and a top groove surface 128. The groove 126 may be configured to receive and secure a support rod 24 that helps to secure the shopping cart basket 100 to the chassis 14 of the shopping cart 10 and to enhance the durability of the shopping cart basket 100. The upper surface 122 and the lower surface 124 may converge toward each other and form an acute angle along each arm 118, 120.

The handle region 114 may be removably or permanently joined to the wire basket region 112. For example, the handle region 114 may be removably connected to the wire basket region 112 using mechanical fasteners, such as screws or multiple snap fit connections. Alternatively, the handle region 114 may be permanently joined to the wire basket region 112 using an adhesive, a mechanical swaging technique, or by molding the handle region 114 onto the wire basket region 112.

The handle region 114 may further comprise at least one front opening 130 or as in the embodiment shown in FIGS. 1-7, a plurality of front openings 130 extending through the main body portion 116. The front openings 130 may be may be located between the upper surface 122 and the top groove surface 128, or more specifically between the handle surface 123 and the top groove surface 128. The handle surface 123 may be spaced downward from the upper surface 122 toward the lower surface 124. Additionally, the handle surface 123 may be spaced a constant distance from the upper surface 122 from the main body portion 116. The plurality of front openings 130 may be substantially trapezoidal in shape, although they may be any shape such as rectangular or elliptical. In addition, the front openings 130 may be tapered where the front portion of the opening is wider than the rear portion of the front openings 130. The front openings 130 may be separated from each other by a forward support rib 132 that connects the upper surface 122 to the top groove surface 128. The forward support rib 132 may extend from the handle surface 123 to the top groove surface 128. The forward support rib 132 may be centrally located along the front side 102 of the shopping cart basket 100. Each of the front openings 130 may be sized such that a customer may extend a portion of their hand through either of the front openings 130 to pull the shopping cart 10 in their desired direction. Each front opening 130 may be sized to have a length measured horizontally of at least 80 mm, or within a range of 80 mm and 140 mm, or within a range of 90 mm and 130 mm. In addition, each of the front openings 130 may have a height measured vertically of at least 30 mm, or within a range of 30 mm and 60 mm, or within a range of 38 mm and 50 mm. As another way of describing the front openings 130, the size of the front openings 130 may have a ratio of the minimum horizontal length to the minimum vertical height within a range of 1.3:1 to 4.6:1, or within a range of 1.8:1 to 3.4:1, or within a range of 2.3:1 to 2.7:1. The minimum horizontal length may be defined as the minimum distance between a corner rib 138 and the forward support rib 132. The minimum height may be defined as the minimum distance between the handle surface 123 and the top groove surface 128.

In addition, a corner section 134 of the handle region 114 may be defined as the section where each of the arms 118, 120 extend from the main body portion 116. Each corner section 134 may have a substantial radius that joins the main body portion 116 to each of the arms 118, 120. Also, each corner section 134 may have a corner opening 136 that extends from the front side 102 towards the rear side 104 and either of the sides 106, 108. The corner openings 136 may be located between the upper surface 122 and the top groove surface 128, or more specifically between the handle surface 123 and the top groove surface 128. The corner openings 136 may also be substantially trapezoidal in shape, although they may be any shape such as rectangular or elliptical. In addition, each corner opening 136 may be separated from a front opening 130 by a corner rib 138 that connects the upper surface 122 to the top groove surface 128. Each corner rib 138 may extend from the handle surface 123 to the top groove surface 128. Each of the corner openings 136 may be sized such that a customer may extend a portion of their hand through either of the corner openings 136 to pull the shopping cart 10 in their desired direction. Each corner opening 136 may have a horizontal length of at least 160 mm, or within a range of 160 mm and 220 mm, or within a range of 170 mm and 200 mm, and may have a vertical height of at least 20 mm, or within a range of 20 mm and 45 mm, or within a range of 15 mm and 50 mm. As another way of describing the corner openings 136, the size of the corner openings 136 may have a ratio of the minimum horizontal length to the minimum vertical height within a range of 3.4:1 to 13.3:1, or within a range of 4.0:1 to 11.3:1, or within a range of 4.9:1 to 8:1. The minimum horizontal length may be defined as the minimum distance between a corner rib 138 and the side rib 146. The minimum height may be defined as the minimum distance between the handle surface 123 and the top groove surface 128.

Each arm 118, 120 may further comprise a recess 140 where the recess 140 is positioned along an exterior side surface 142 of each arm 118, 120. The recess 140 may provide another location for a customer to grasp on the shopping cart 10. At least a portion of each recess 140 may be positioned above each of the corresponding corner openings 136 and may have a length that is less than the length of the corner opening 136. The recess 140 may have a length of at least 130 mm. The recess 140 may be elongated and generally elliptical in shape and include a smooth rounded concave lower surface.

Additionally, each arm 118, 120 may include a side opening 144 spaced rearward and separated from the corner opening 136 by a side rib 146. Each side opening 144 may be generally triangular in shape and have a maximum height of at least 20 mm. In addition, the handle region 114 may have smooth rounded exterior surfaces adjacent and along the edges of the openings to provide a comfortable surface for the customer to grasp.

Figure 6:
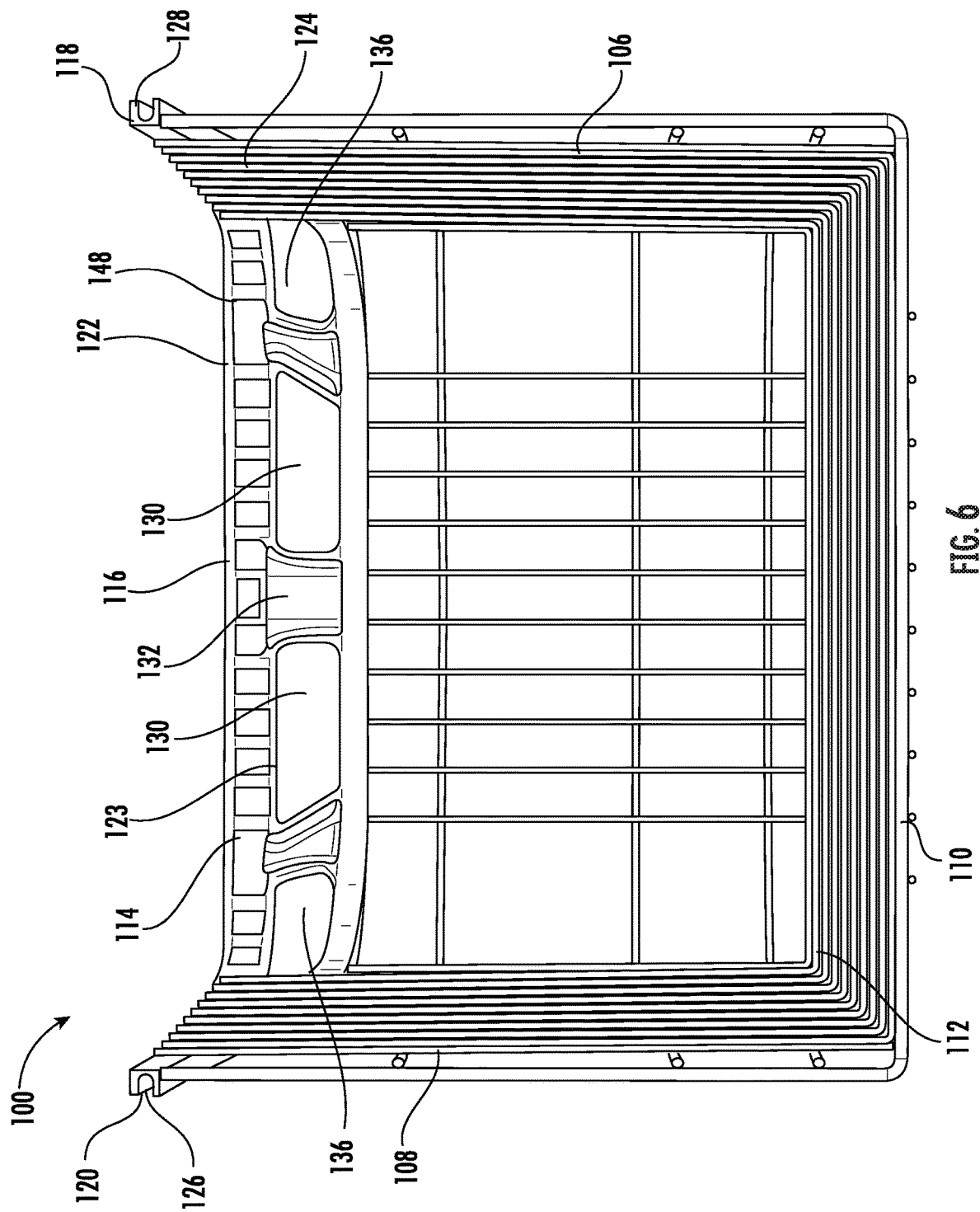
FIG. 6 illustrates a rear view of the shopping cart basket of the embodiment shown in FIG. 1 as disclosed herein.
Figure 7:
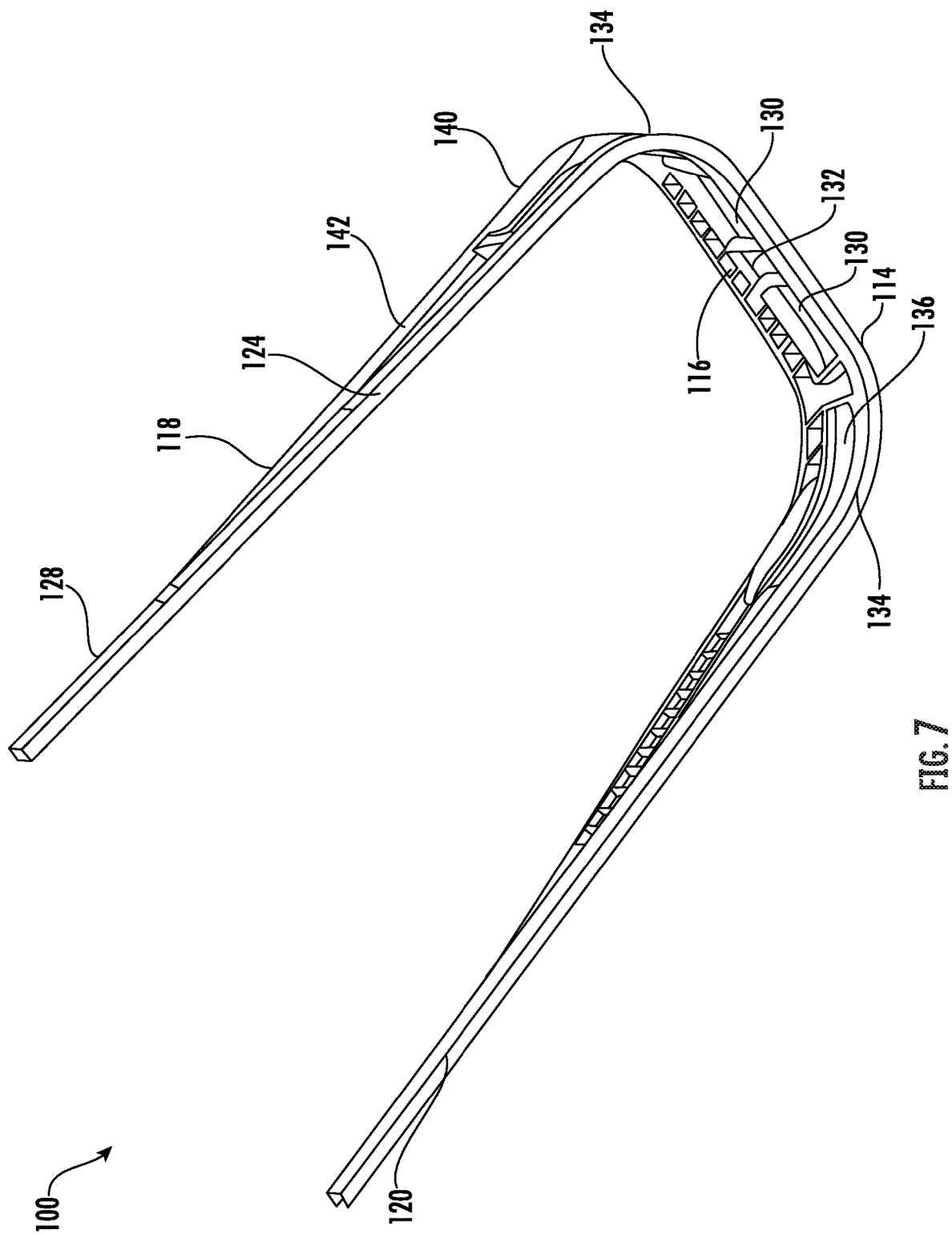
FIG. 7 illustrates a bottom back perspective view of a handle region of the shopping cart basket as disclosed herein with the wire portion of the shopping cart basket removed.
Figure 8:
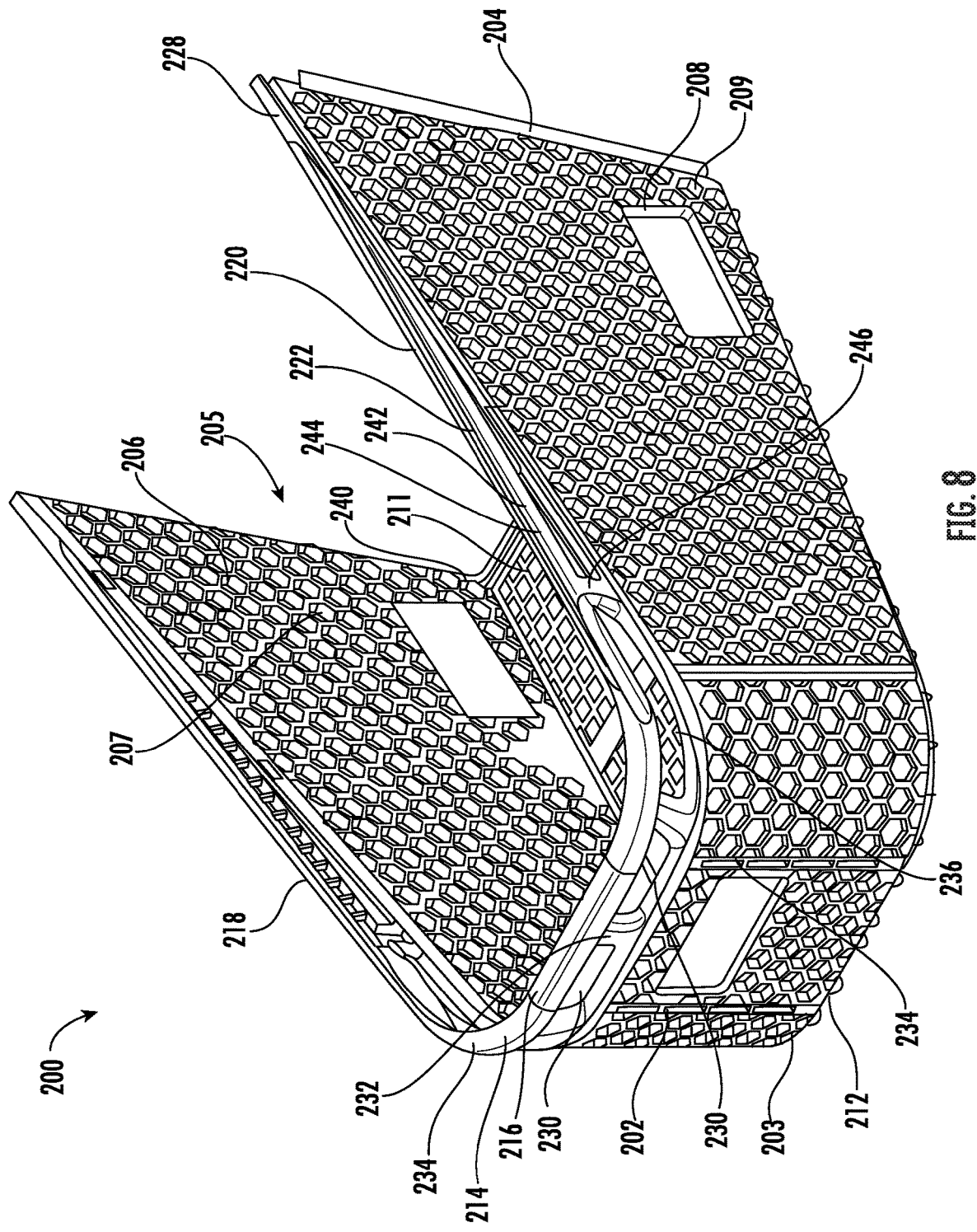
FIG. 8 illustrates a top front perspective view of an alternate embodiment of a shopping cart basket as disclosed herein.
Figure 9:
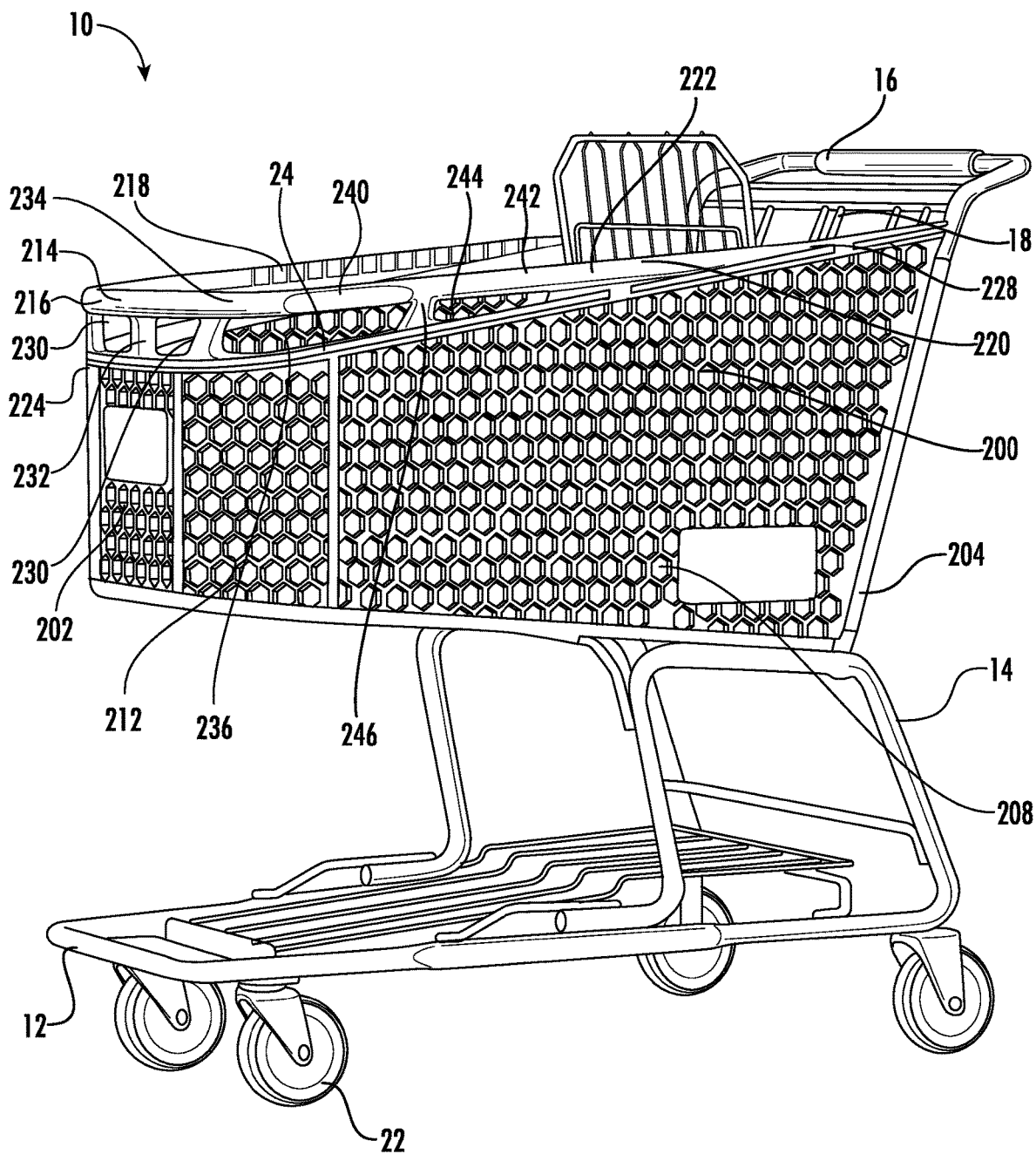
FIG. 9 illustrates a top front perspective view of an embodiment of a shopping cart having a shopping cart basket as shown in FIG. 8 as disclosed herein.
Figure 10:
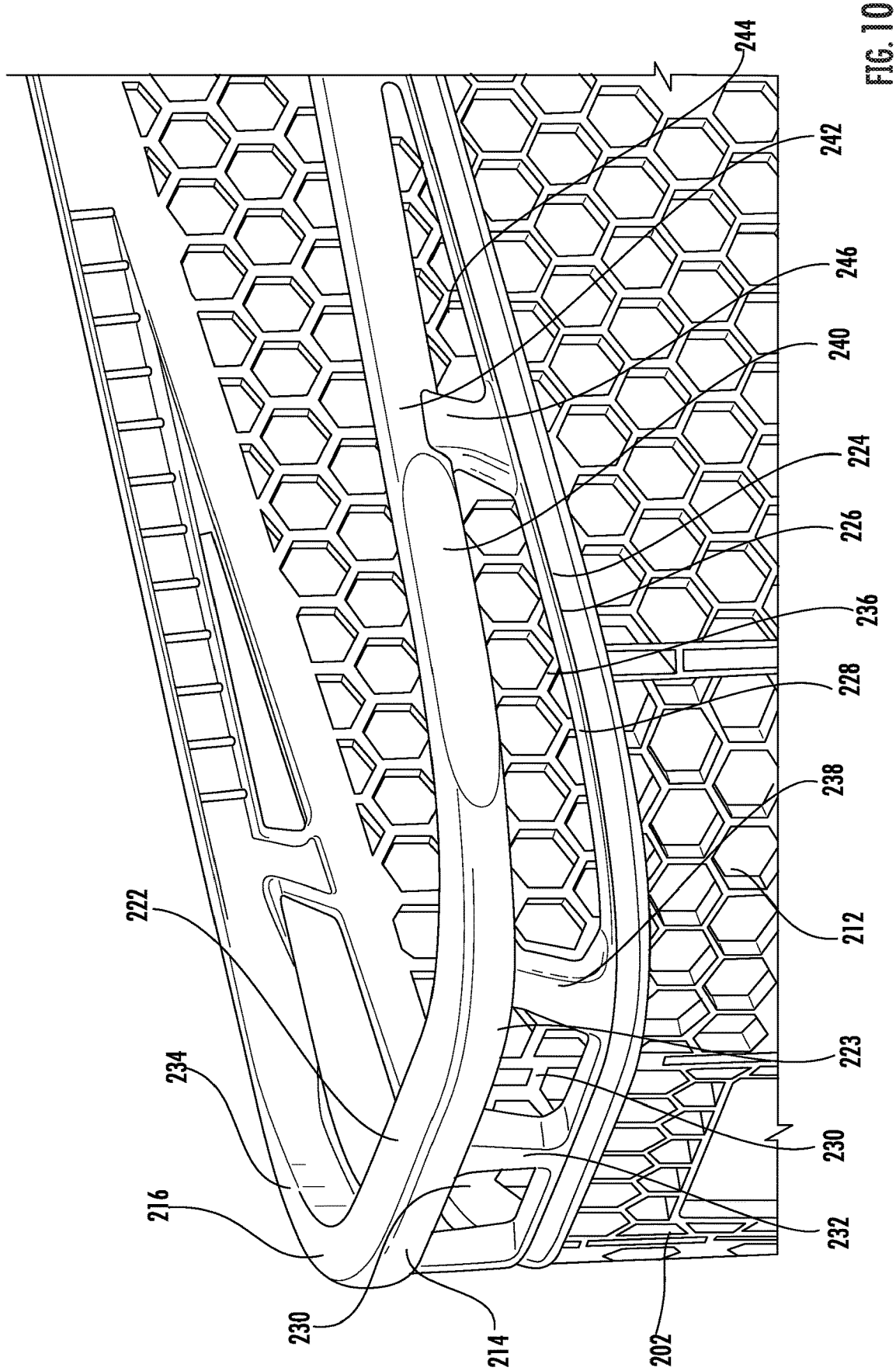
FIG. 10 illustrates an enlarged view of the front portion of the perspective view of the shopping cart basket shown in FIG. 8 as disclosed herein.
Figure 11:
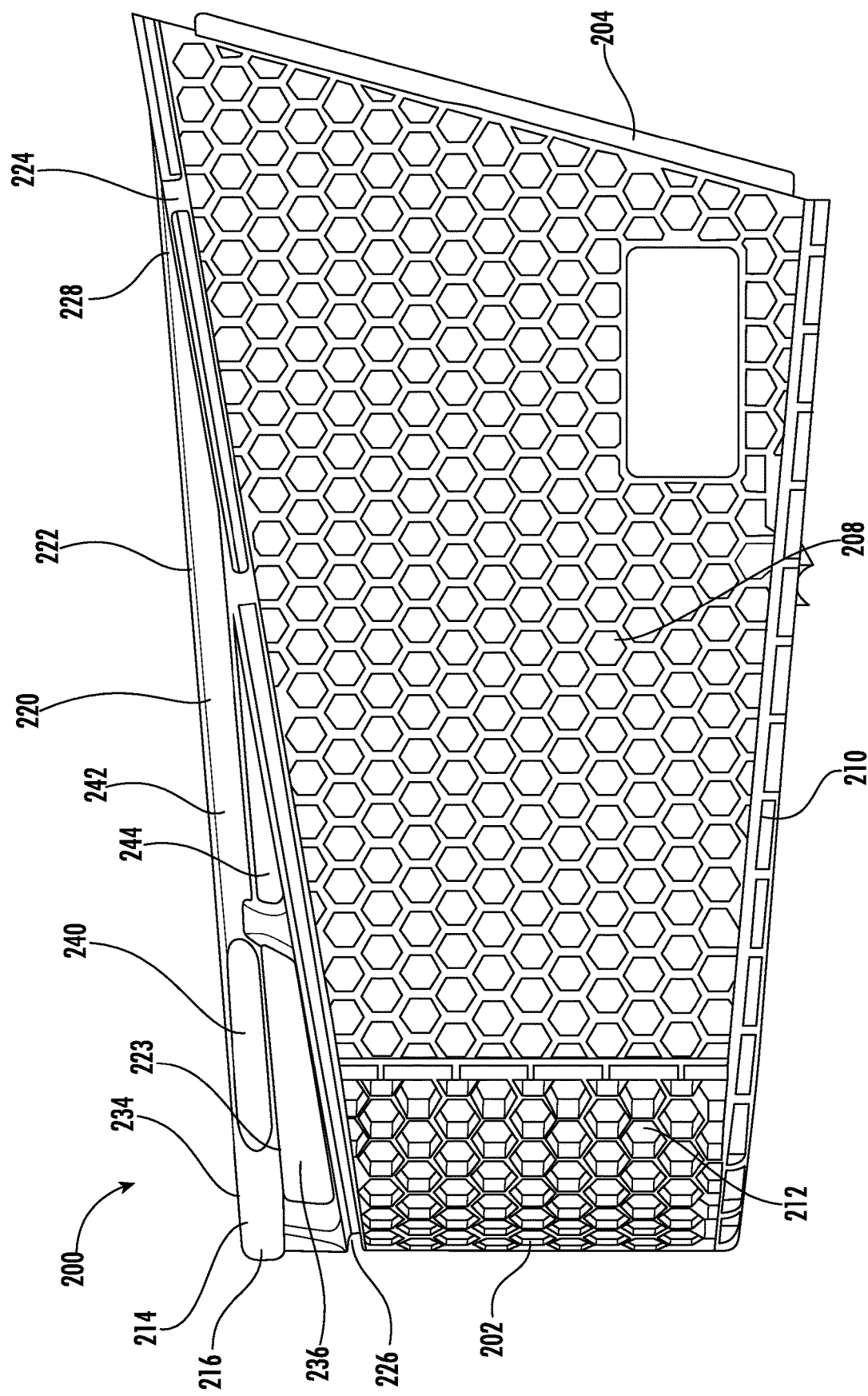
FIG. 11 illustrates a side view of the shopping cart basket of the embodiment shown in FIG. 8 as disclosed herein.
Figure 12:
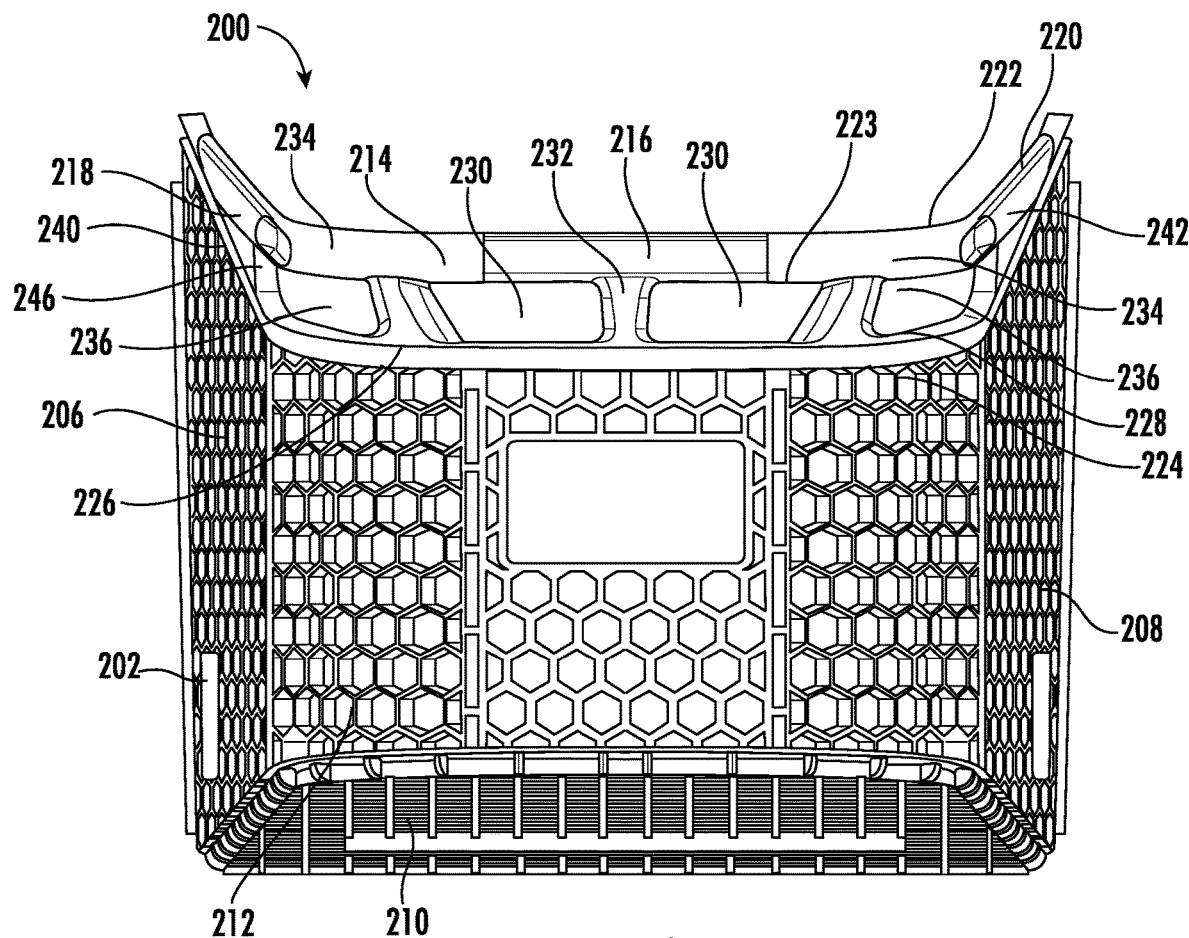
FIG. 12 illustrates a front view of the shopping cart basket of the embodiment shown in FIG. 8 as disclosed herein.

As shown in FIGS. 6 and 7, a plurality of interior ribs 148 may be present between the upper surface 122 and the handle surface 123 of the front openings 130, the corner openings 136, and the side openings 144. These interior ribs 148 allow the handle region 114 to be lightweight and still provide the structural strength for durability of the shopping cart basket 100.

As discussed above, the handle region 114 may be formed of a polymer material, such as nylon, polycarbonate, or other rigid polymer. The polymer material may be fiber filled or unfilled. Further, the handle region 114 may be formed from a molding process such as injection or rotational molding.

The wire basket region 112 may be formed from a plurality of individual wires oriented horizontally and vertically that cross at right angles to form a wire mesh 113. The mesh is permanently joined as known to own skilled in the art.

FIGS. 8-13 illustrate an alternate embodiment of shopping cart basket 200, where the shopping cart basket is made of polymer material. For embodiment of FIGS. 8-13, the features are referred to using similar reference numerals under the "2xx" series of reference numerals, rather than "1xx" as used in the embodiment of FIGS. 1-7. Accordingly, certain features of the shopping cart basket 200 that were already described above with respect to shopping cart basket 100 of FIGS. 1-7 may be described in lesser detail, or may not be described at all. Shopping cart basket 200 may be formed as a single integral piece such that the handle region 214 is formed with the lower basket portion 212. The lower basket portion 212 may generally have a honeycomb structure formed from a plurality of nested hexagonal shaped walls, where the honeycomb structure includes a plurality of visible openings.

The handle region 214 may have a similar structure described above with respect to the handle region 114 described above. The handle region 214 may further comprise at least one front opening 230 or as in the embodiment shown in FIGS. 8-13, a plurality of front openings 230. The front openings 230 may be positioned between the top groove surface 228 and a handle surface 223 spaced downward from the upper surface 222 toward the lower surface 224. The handle surface 223 may be spaced a constant distance from the upper surface 222 along the main body portion 216. The plurality of front openings 230 may be separated from each other by a forward support rib 232 that connects the upper surface 222 to the top groove surface 228. The forward support rib 132 may extend from the handle surface 223 to the top groove surface 228. Each of the front openings 230 may be sized such that a customer may extend a portion of their hand through either of the front openings 230 to pull the shopping cart 10 in their desired direction. Each front opening 230 may be sized to have a length measured horizontally of at least 80 mm, or within a range of 80 mm and 140 mm, or within a range of 90 mm and 130 mm. In addition, each of the front openings 230 may have a height measured vertically of at least 30 mm, or within a range of 30 mm and 60 mm, or within a range of 38 mm and 50 mm. As another way of describing the front openings 230, the size of the front openings 230 may have a ratio of the minimum horizontal length to the minimum vertical height within a range of 1.3:1 to 4.6:1, or within a range of 1.8:1 to 3.4:1, or within a range of 2.3:1 to 2.7:1. The minimum horizontal length may be defined as the minimum distance between a corner rib 238 and the forward support rib 232. The minimum height may be defined as the minimum distance between the handle surface 223 and the top groove surface 228.

In addition, a corner section 234 of the handle region 214 may be defined as the section where each of the arms 218, 220 extend from the main body portion 216. Each corner section 234 may have a substantial radius that joins the main body portion 216 to each of the arms 218, 220. Also, each corner section 234 may have a corner opening 236 that extends from where the front side 202 towards the rear side 204 and either of the sides 206, 208. The corner openings 236 may be separated from a front opening 130 by a corner rib 238 that connects the upper surface 222 to the top groove surface 228. Each corner rib 238 may extend from the handle surface 223 to the top groove surface 228. Each of the corner openings 236 may be sized such that a customer may extend a portion of their hand through either of the corner openings 236 to pull the shopping cart 10 in their desired direction. Each corner opening 236 may have a horizontal length of at least 160 mm, or within a range of 160 mm and 220 mm, or within a range of 170 mm and 200 mm, and may have a vertical height of at least 20 mm, or within a range of 20 mm and 45 mm, or within a range of 15 mm and 50 mm. As another way of describing the corner openings 236, the size of the corner openings 236 may have a ratio of the minimum horizontal length to the minimum vertical height within a range of 3.4:1 to 13.3:1, or within a range of 4.0:1 to 11.3:1, or within a range of 4.9:1 to 8:1. The minimum horizontal length may be defined as the minimum distance between a corner rib 238 and the side rib 246. The minimum height may be defined as the minimum distance between the handle surface 223 and the top groove surface 228.

Each arm 218, 220 may further comprise a recess 240 where at least a portion of the recess 240 is positioned along an exterior side surface 242 of each arm 218, 220. The recess 240 may provide another location for a customer to grasp on the shopping cart 10. At least a portion of each recess 240 may be positioned above each of the corresponding corner openings 236 and may have a length that is less than the length of the corner opening 236. The recess 240 may have a length of at least 130 mm. The recess 240 may be elongated in shape and include a smooth rounded concave lower surface.

Figure 13:
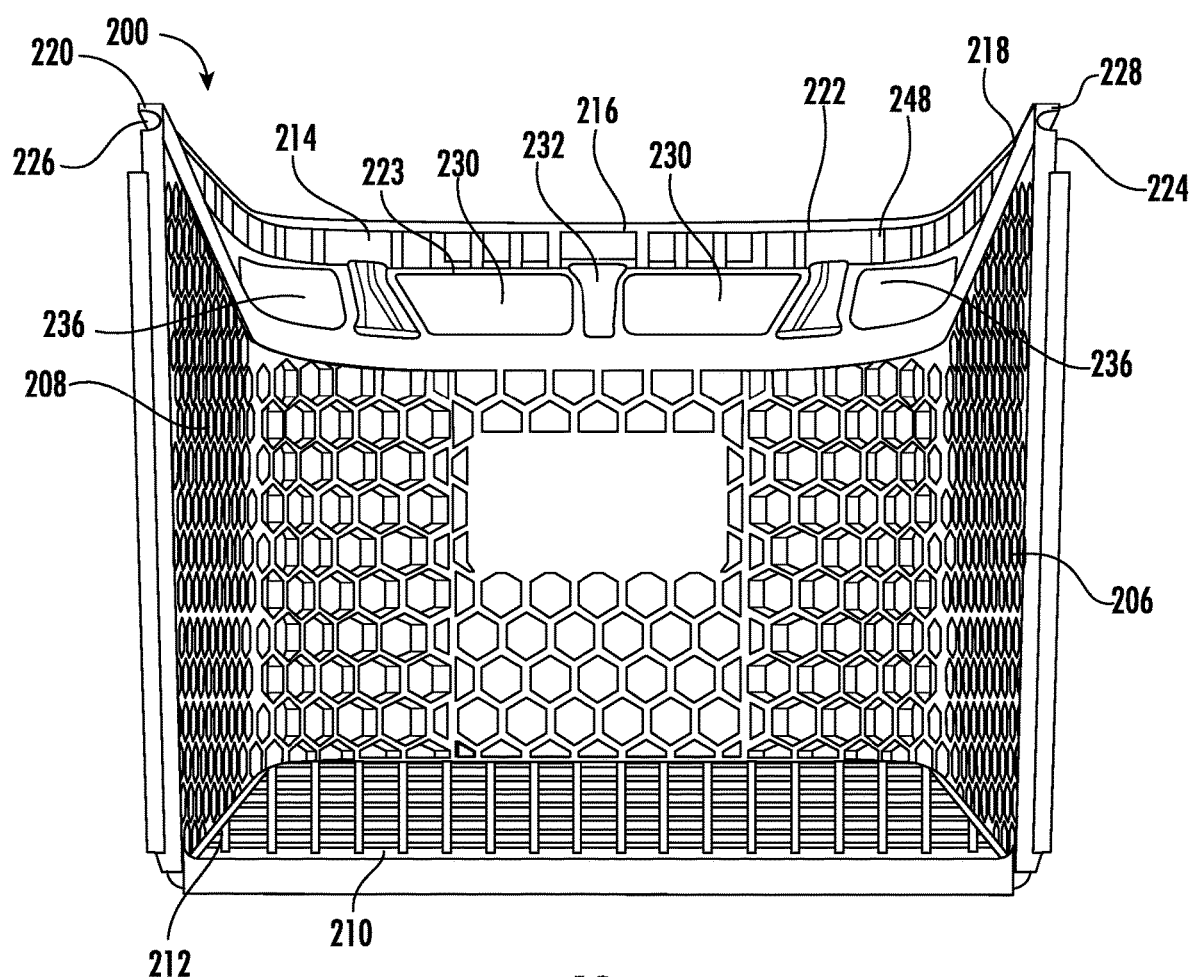
FIG. 13 is rear view of the shopping cart basket of the embodiment shown in FIG. 8 as disclosed herein.
Figure 14:
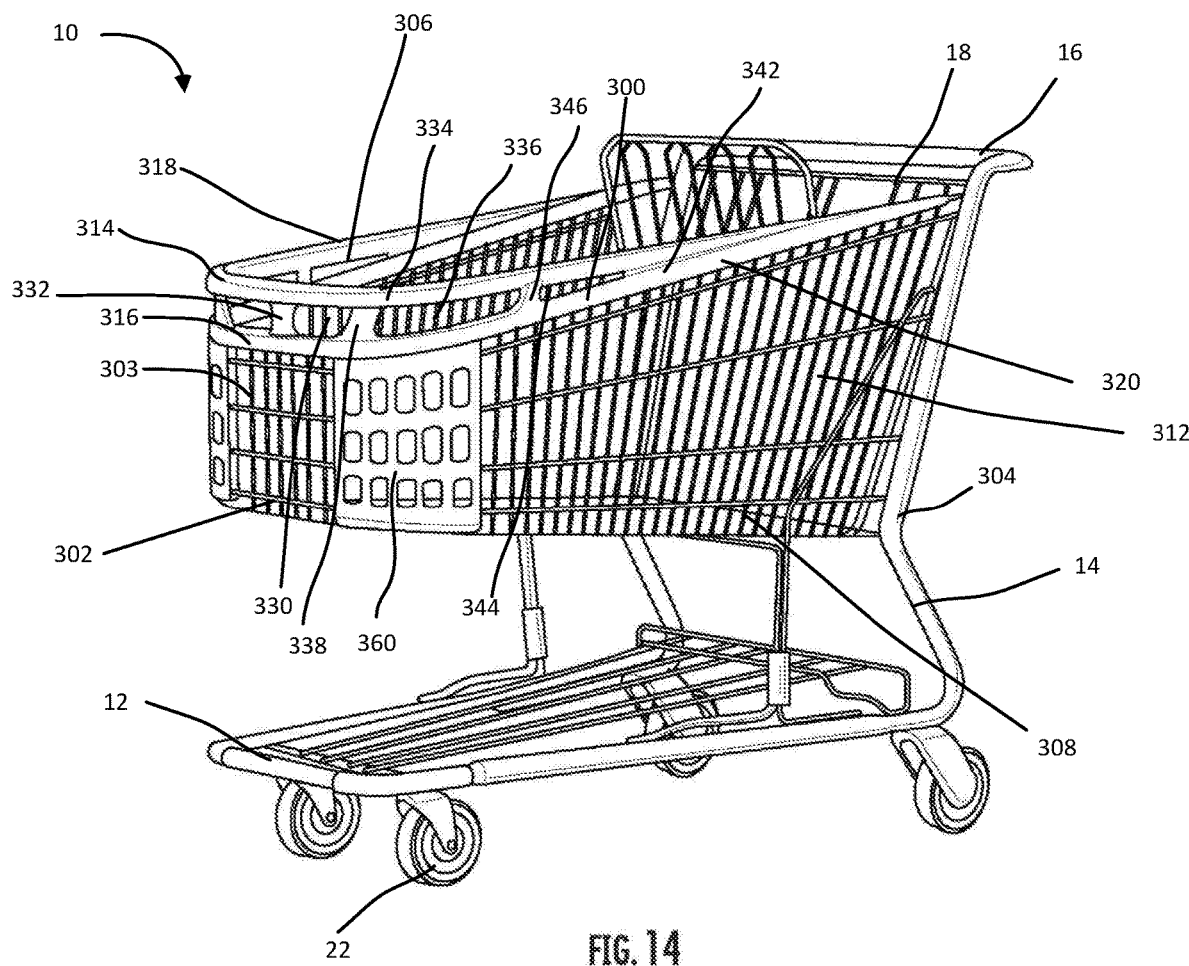
FIG. 14 illustrates a top front perspective view of an alternative embodiment of a shopping cart as disclosed herein.
Figure 15:
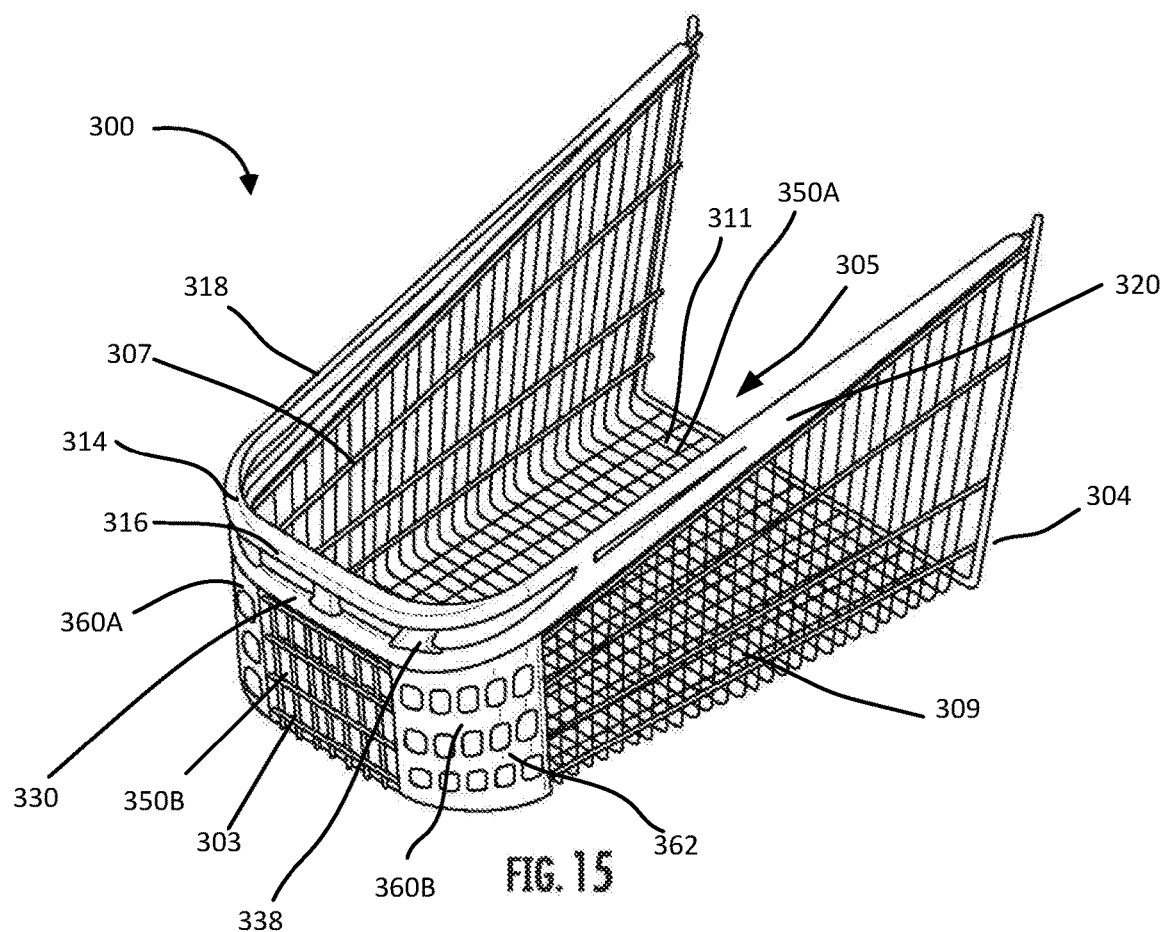
FIG. 15 illustrates a top front perspective view of the shopping cart basket of the shopping cart shown in FIG. 14 as disclosed herein.
Figure 16:
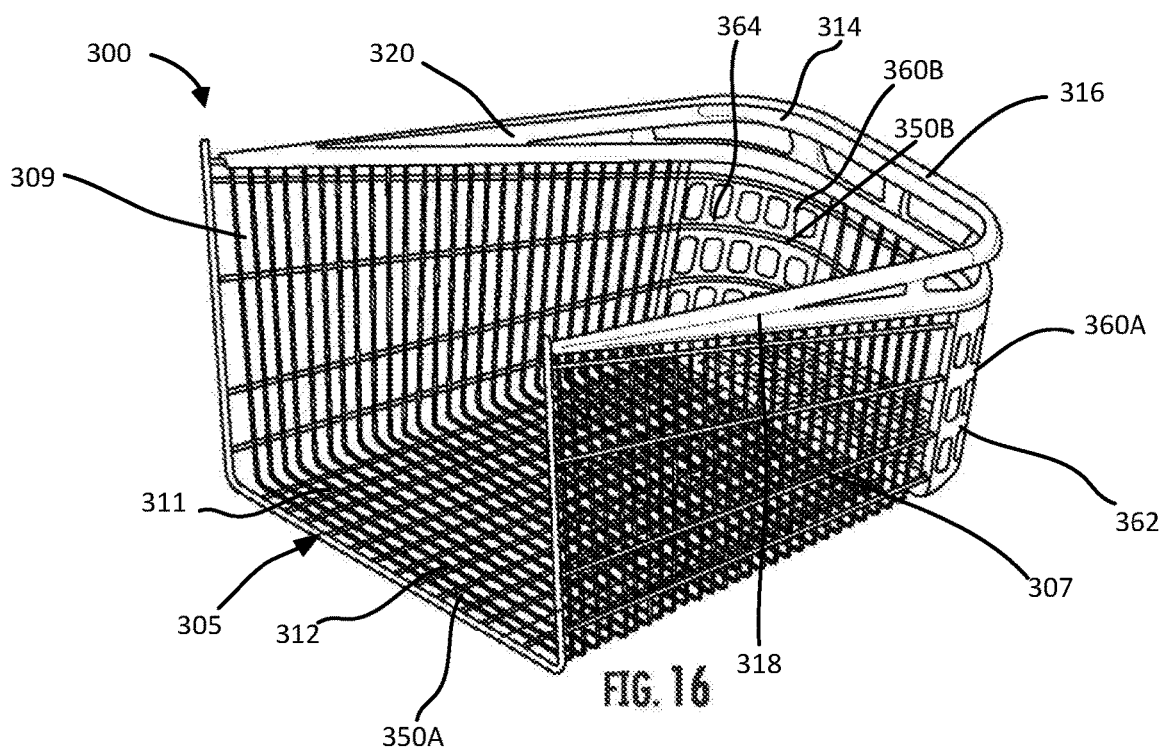
FIG. 16 illustrates a top rear perspective view of the shopping cart basket of the shopping cart shown in FIG. 14 as disclosed herein.
Figure 17:
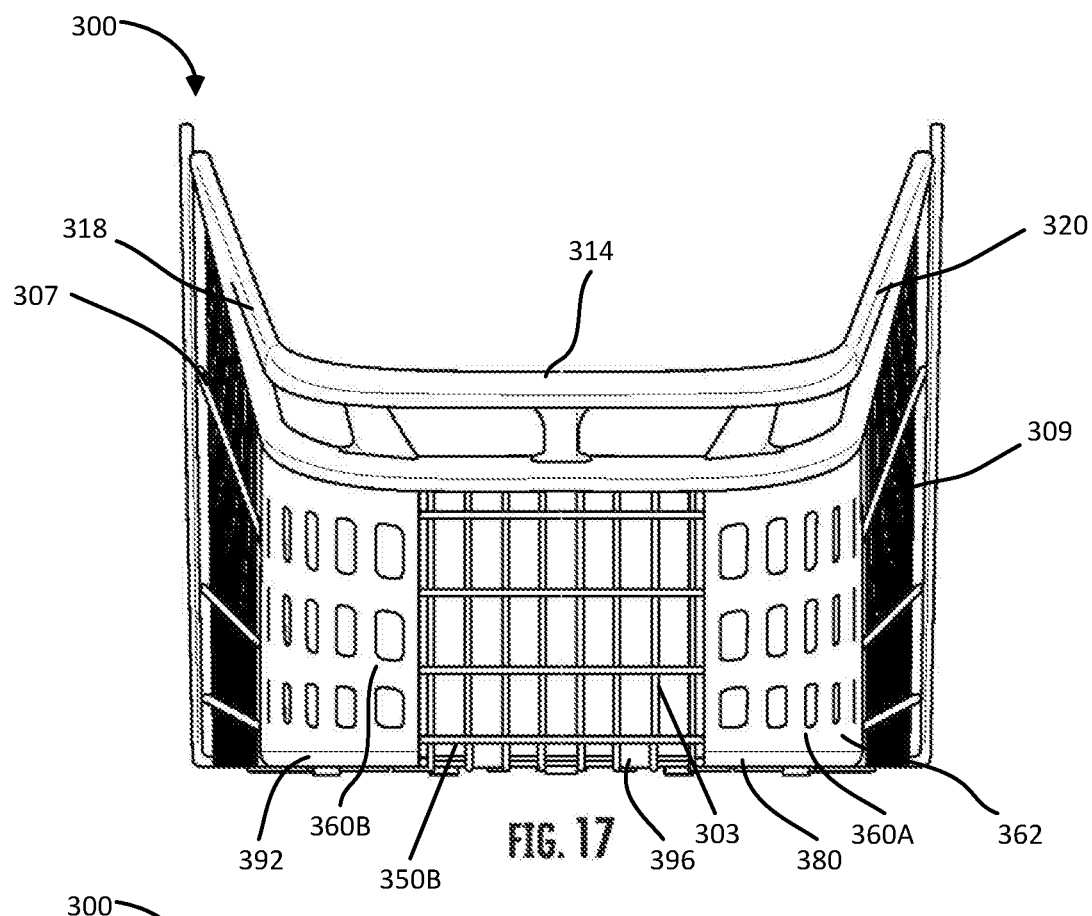
FIG. 17 illustrates a front view of the shopping cart basket of the embodiment shown in FIG. 15 as disclosed herein.
Figure 18:
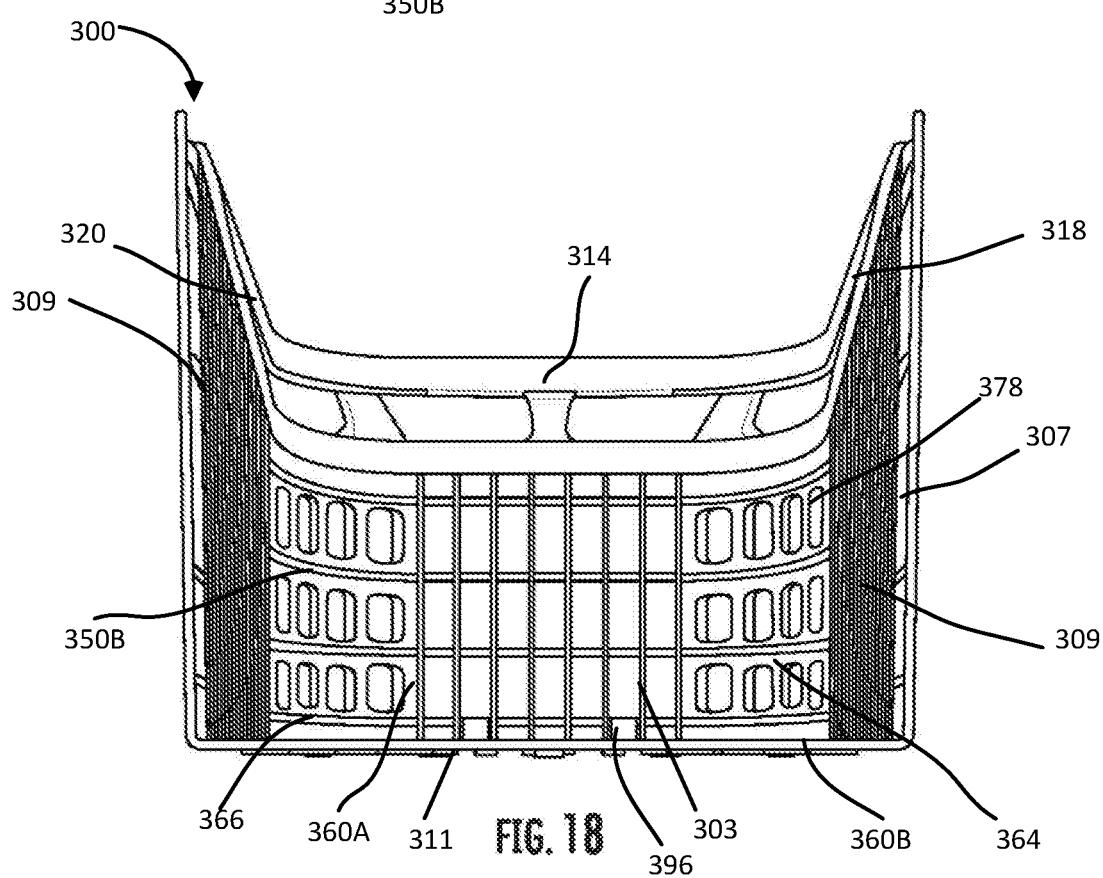
FIG. 18 illustrates a rear view of the shopping cart basket of the embodiment shown in FIG. 15 as disclosed herein.
Figure 19:
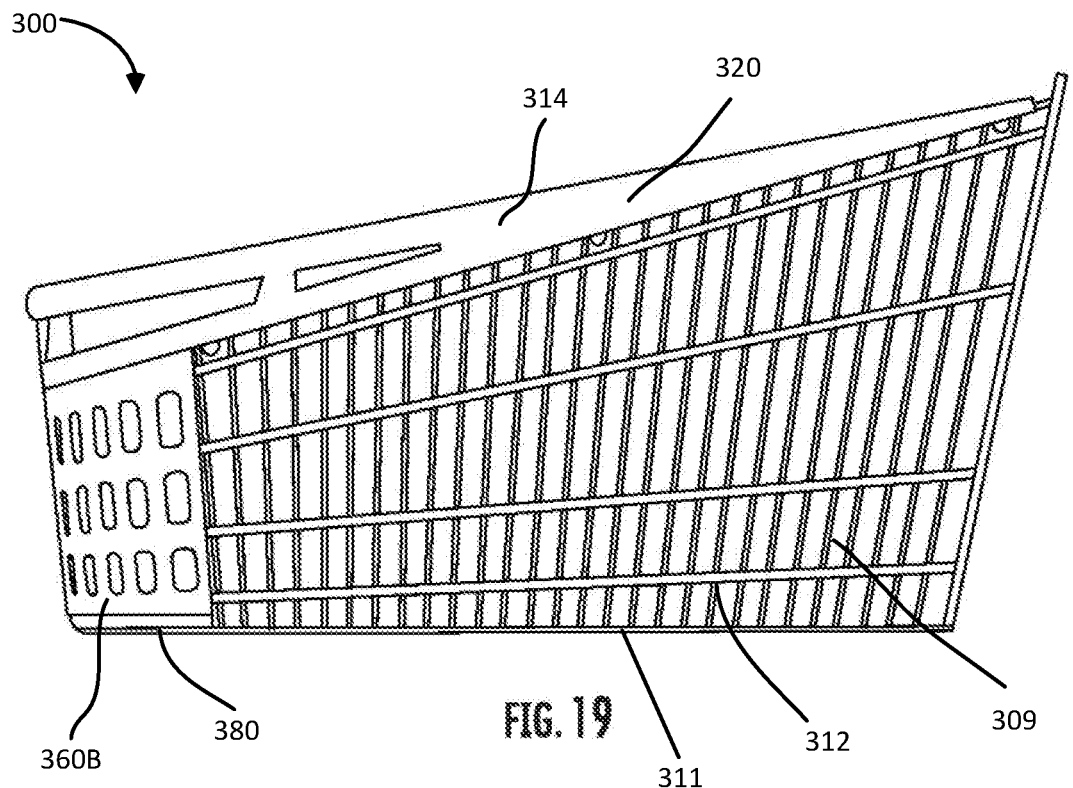
FIG. 19 illustrates a right side view of the shopping cart basket of the embodiment shown in FIG. 15 as disclosed herein.
Figure 20:
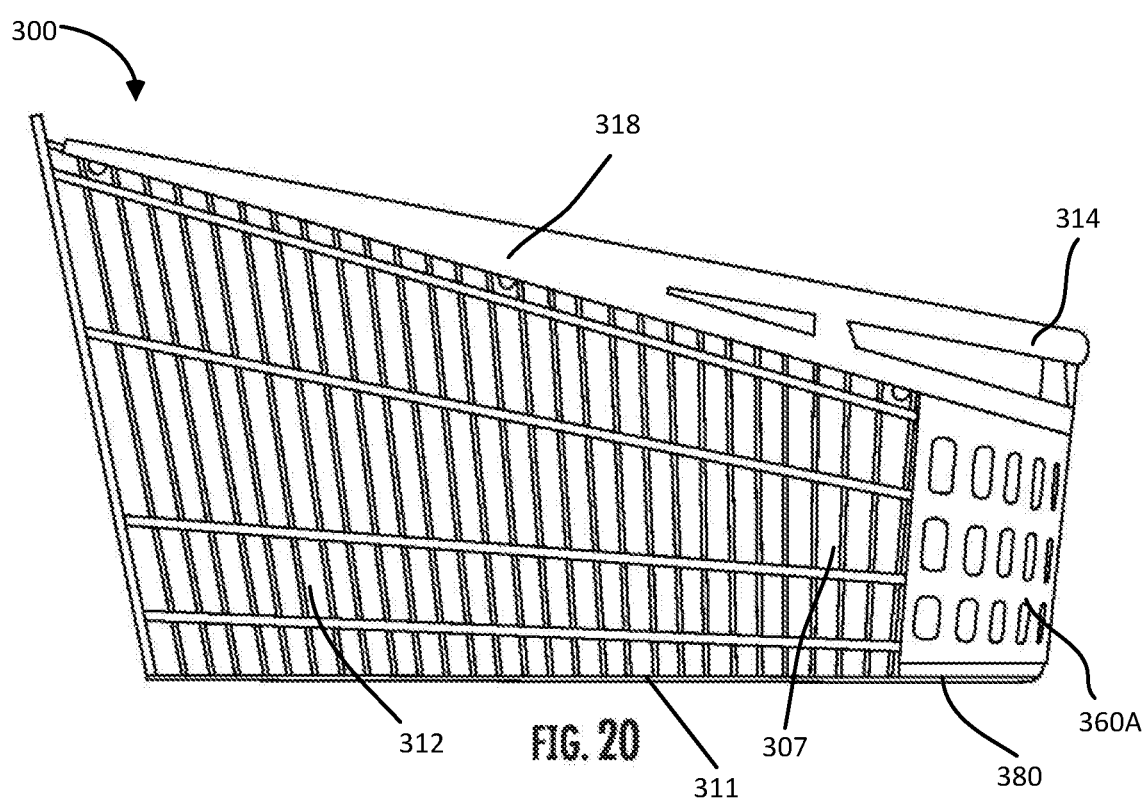
FIG. 20 illustrates a left side view of the shopping cart basket of the embodiment shown in FIG. 15 as disclosed herein.
Figure 21:
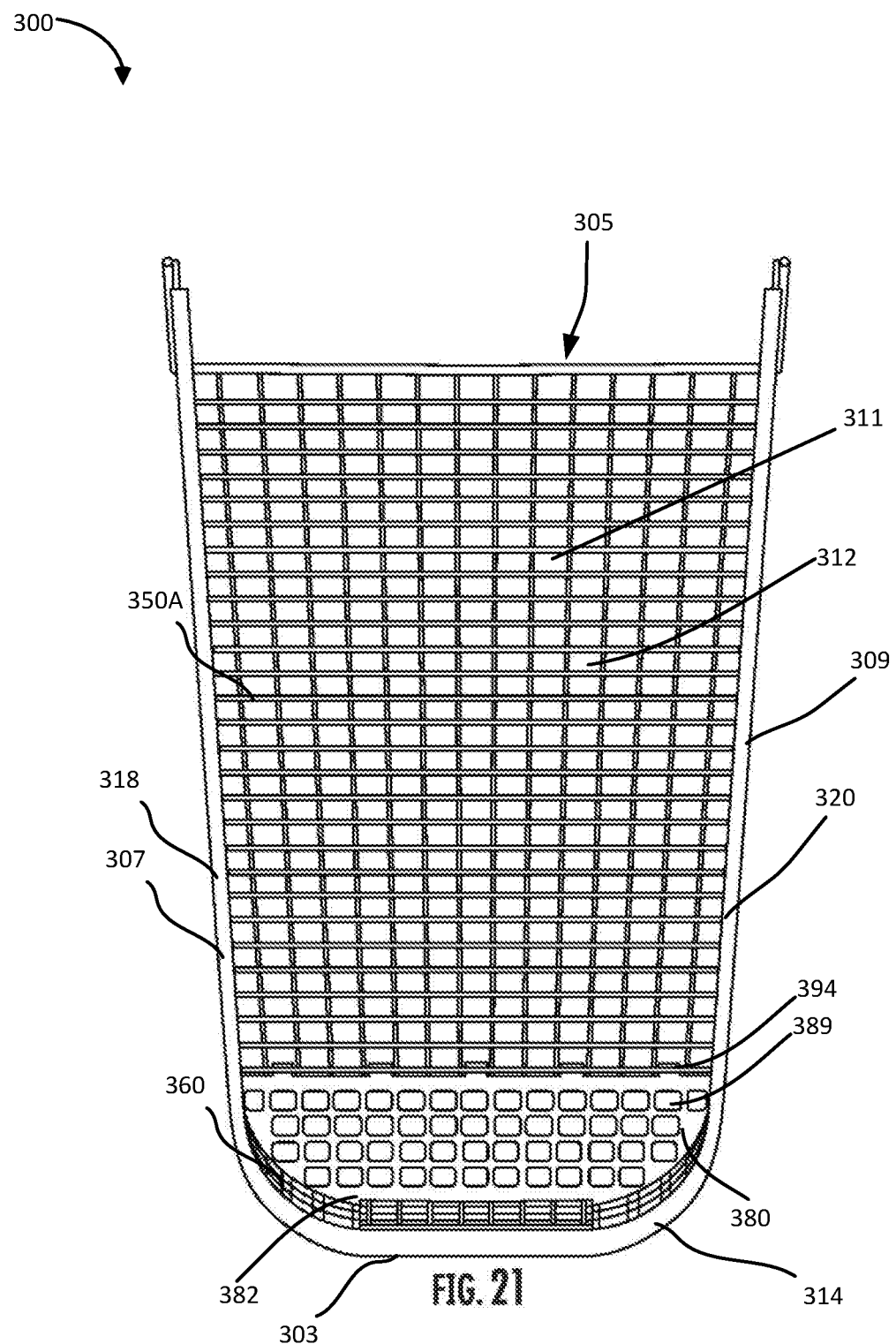
FIG. 21 illustrates a top view of the shopping cart basket of the embodiment shown in FIG. 15 as disclosed herein.
Figure 22:
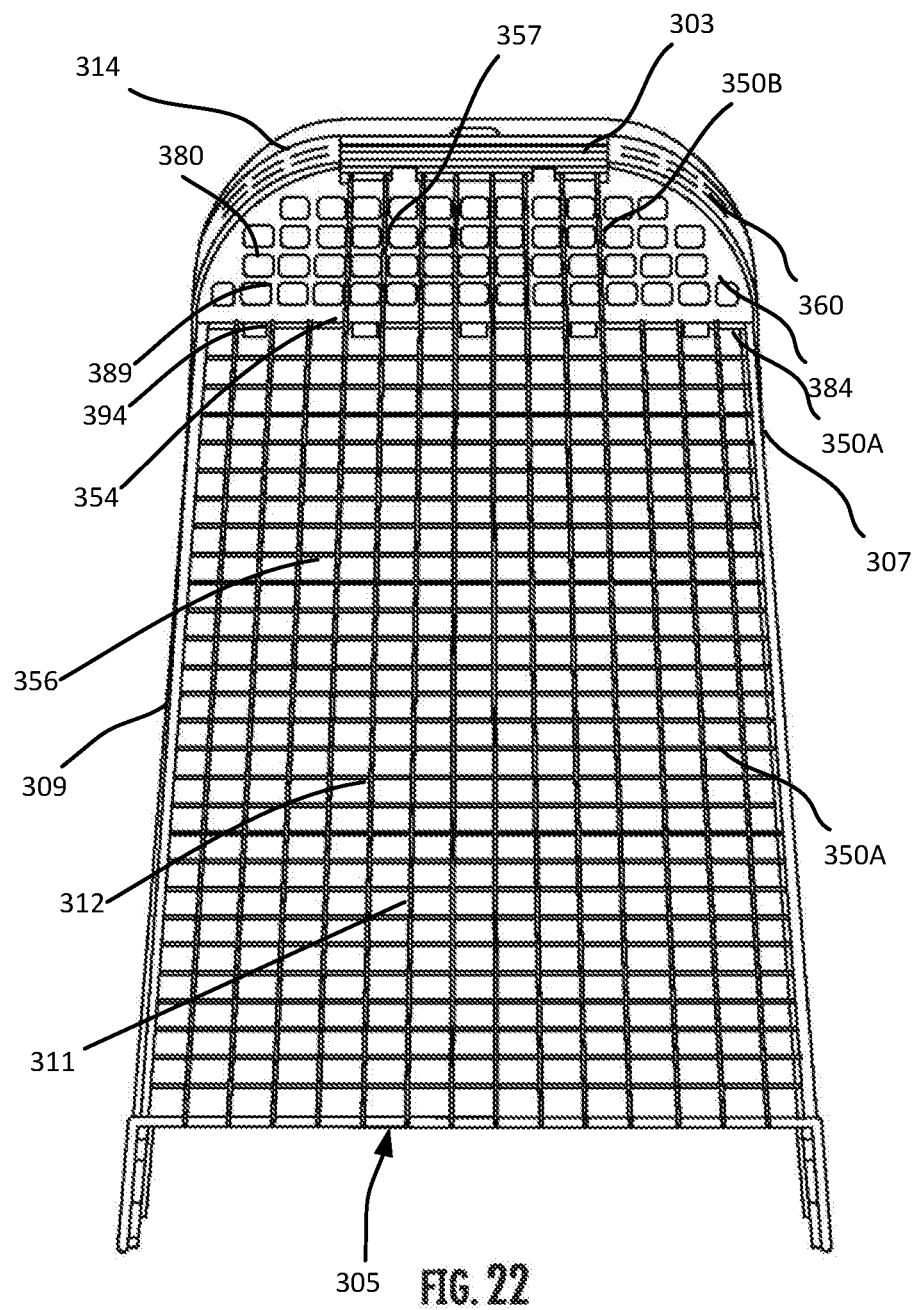
FIG. 22 illustrates a bottom view of the shopping cart basket of the embodiment shown in FIG. 15 as disclosed herein.
Figure 23:
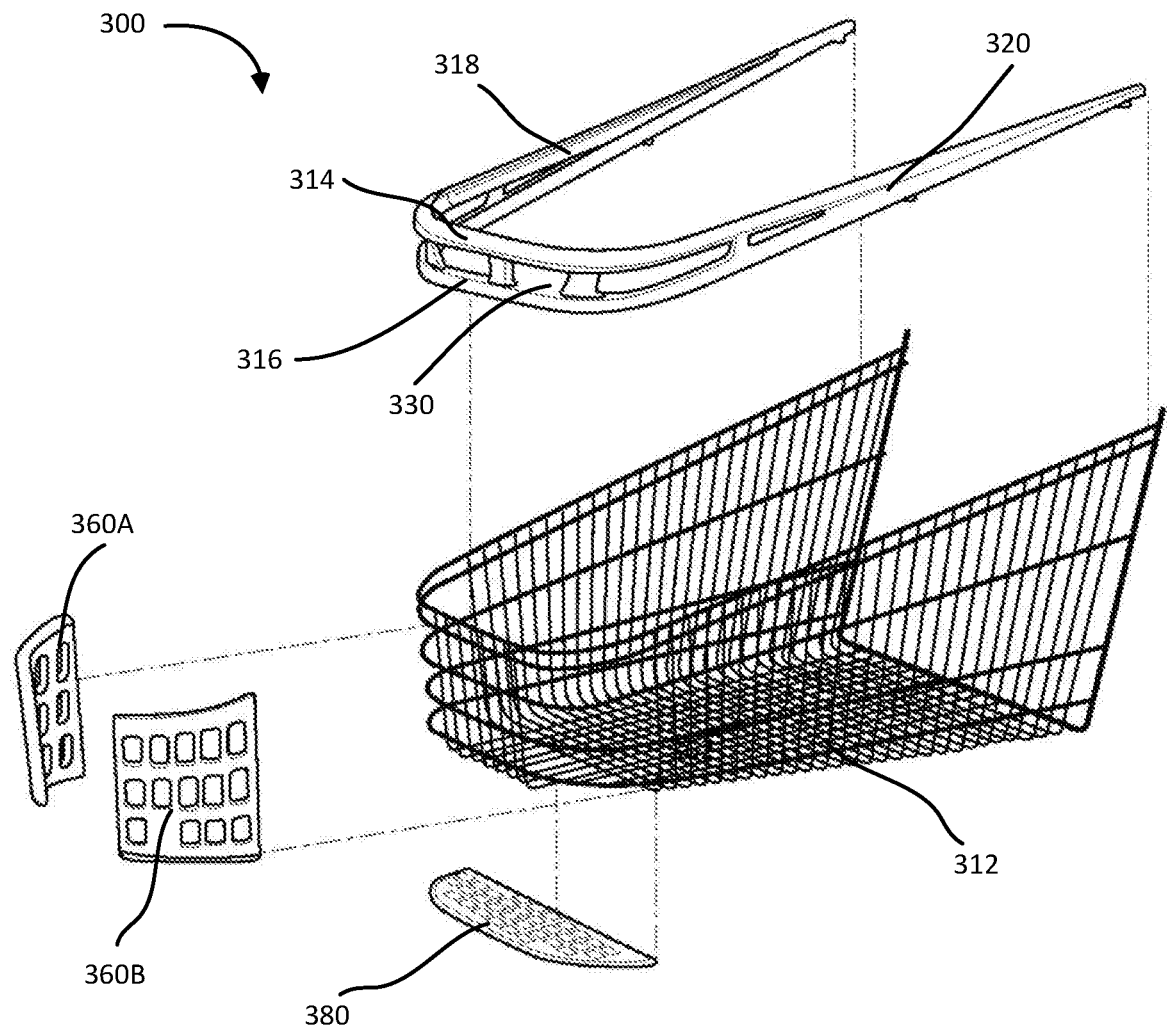
FIG. 23 illustrates an exploded top front perspective view of the shopping cart basket of the embodiment shown in FIG. 15 as disclosed herein.

Additionally, each arm 218, 220 may also include a side opening 244 spaced rearward and separated from a side rib 246. In addition, as shown in FIG. 13, the a plurality of interior ribs 248 may be present between the upper surface 222 and the upper surfaces of the front openings 230, the corner openings 236, and the side openings 244. These interior ribs 248 allow the handle region 214 to be lightweight and still provide the structural strength for durability of the shopping cart basket 200.

The shopping cart basket 200 may be formed from a polymer material, such as nylon, polycarbonate, or other rigid polymer. The polymer material may be fiber filled or unfilled. Further, the shopping cart basket 200 may be formed from multiple components that are formed and then joined together or formed as a single integral piece. In addition, the shopping cart basket 200 may be formed from a molding process such as injection or rotational molding.

As another alternative option of both shopping cart baskets 100 and 200, the handle regions 114, 214 of each configuration may be without either or both of the front openings 130, 230, either or both of the corner openings 136, 236, and either or both of the side openings 144, 244.

FIGS. 14-36 illustrate example shopping cart basket 300. In this example, shopping cart basket 300 has a hybrid type construction meaning that the shopping cart basket 300 may be made from multiple components such as having a wire basket portion 312 formed from a metallic component that forms the lower portion of the shopping cart basket 300 and a forward handle 314 formed from a non-metallic or polymer component that forms the upper portion of the shopping cart basket 300. For shopping cart basket 300 of FIGS. 14-36, the features are referred to using similar reference numerals under the "3xx" series of reference numerals, rather than "1xx" as used in the embodiment of FIGS. 1-7. Accordingly, certain features of the shopping cart basket 300 that were already described above with respect to basket 100 of FIGS. 1-7 may be described in lesser detail, or may not be described at all. Similar to shopping cart baskets 100, 200, shopping cart basket 300 may include a front side or front end 302, a rear side or rear end 304 opposite the front end 302, a left side 306, a right side 308, and a bottom side 310. The shopping cart basket may include a front wall 303 on the front end 302, a rear opening 305 on the rear end 304 opposite the front wall 303, a left side wall 307 extending between the front wall 303 and the rear end 304, a right side wall 309 extending between the front wall 303 and the rear end 304 opposite the left side wall 107, and a bottom wall 311 extending between the front wall 303, the left side wall 307, and the right side wall 309. The forward handle 314 may have similar features to the forward handle 114, 214 of shopping cart baskets 100, 200 described above. For example, the forward handle 314 may include a main body portion 316 positioned along the top of the front end 302 of the basket 300 with a pair of arms 318, 320 extending from each end of the main body portion 316 and extending along the top of both the left side 306 and the right side 308 of the shopping cart basket 300. Each of the arms 318, 320 may extend up the entire length of the left side 306 and right side 308 respectively of the shopping cart basket 300. Alternatively, each of the arms 318, 320 may extend up the majority of the length of the left side 306 and right side 308 respectively of the shopping cart basket 300. In addition, the forward handle region 314 may be symmetrical around a plane extending in a vertical direction through a midpoint of the main body portion 316.

In addition, shopping cart 300 may include a forward handle 314 located along an upper or uppermost wire 350 of the wire basket portion 312, a pair of non-metallic corner inserts 360, and a bottom insert 380. Each corner insert 360 may extend from the bottom insert 380 to the forward handle 314, where each corner insert 360 may engage both the bottom insert 380 and the forward handle 314 to secure the corner inserts 360 to the basket 300. In some examples, the corner inserts may connect to the forward handle 314 and the bottom insert 380 with a snap-fit connection.

The forward handle 314 may have a recess 325 on a bottom surface 324, where the recess 325 receives an uppermost wire 350C of the plurality of wires 350 that form the wire basket portion 312. The recess 325 may also form an undercut within the recess 325 to engage each of the corner inserts 360.

The bottom insert 380 may form a forward region 354 of the bottom wall 311 that extends rearward from the front wall 303 to a bottom wire mesh region 356 of the bottom wall. The bottom insert 380 may have a length when measured in a direction oriented from the front end 302 to the rear end 304 of approximately 15 percent of the overall length of the bottom wall 311, or may have a length within a range of 10 percent to 20 percent of the overall length of the bottom wall 311. The bottom insert 380 may have a top surface 382, a bottom surface 384 opposite the top surface 382, a front surface 386, a rear surface 388 opposite the front surface 386, a pair of side surfaces 390, and a pair of corner surfaces 392 extending between each side surface 390 and the front surface 386. The top surface 382 may be substantially planar with a plane formed by the top of the wires 350 of the bottom wire mesh portion 356, or in some examples, the top surface 382 may be within 0.7 cm of a plane formed by the top of the wires 350 of the bottom wire mesh portion 356. The bottom insert 380 may have a plurality of rear tabs 394 extending from the rear surface 388. Each tab 394 may have a lower ledge 397 that extends below the bottom surface 384. Each lower ledge 397 may engage a wire 350A that extends between the left side wall 307 and the right side wall 309 where the lower ledge 397 is positioned below the wire 350A. The rear tabs 394 may help secure the bottom insert 380 to the bottom wire mesh portion 356. While the example embodiment in FIGS. 14-24 illustrate the bottom insert 380 as having five rear tabs 394, the bottom insert 380 may have any number of tabs 394, (i.e. two tabs, three tabs, four tabs, or a the number of tabs 394 is equal to a number of openings formed along wire 350A by the wire mesh portion 356). In addition, the bottom insert 380 may also have a plurality of forward tabs 396 that extend forward from the front surface 386. Each of the forward tabs 396 may extend above the top surface 382 and have a ledge 399, where the ledge 399 engages a perimeter wire 350C on the front wall 303. When installed, the ledge 399 may be located rearward of perimeter wire 350C. The ledge 399 may have a tapered region where a thickness the uppermost portion of the ledge 399 may be smaller than a lower portion of the ledge 399. The bottom surface 384 of the bottom insert 380 may be located on top of a central forward region 357 of a plurality of individual wires 350B that extend from the front end 302 to the rear end 304 of the bottom wall 311. In addition, a forwardmost edge 393 of corner surfaces 392 may be located forward of front surface 386 such that front surface 386 is spaced rearward of edge 393.

In addition, side surfaces 390 may extend from the bottom surface 384 to an uppermost surface 391, where the uppermost surface 391 may have an engaging member 395 extending inward away from the side surfaces 390. The engaging member 395 may form an upper undercut 398 between the engaging member 395 and the top surface 382. The bottom insert 380 may also have a plurality of openings 389 that extend through the top and bottom surfaces 382, 384. The openings 389 may have substantially square shaped openings or alternatively, the openings 389 may have any geometric shape.

Figure 36:
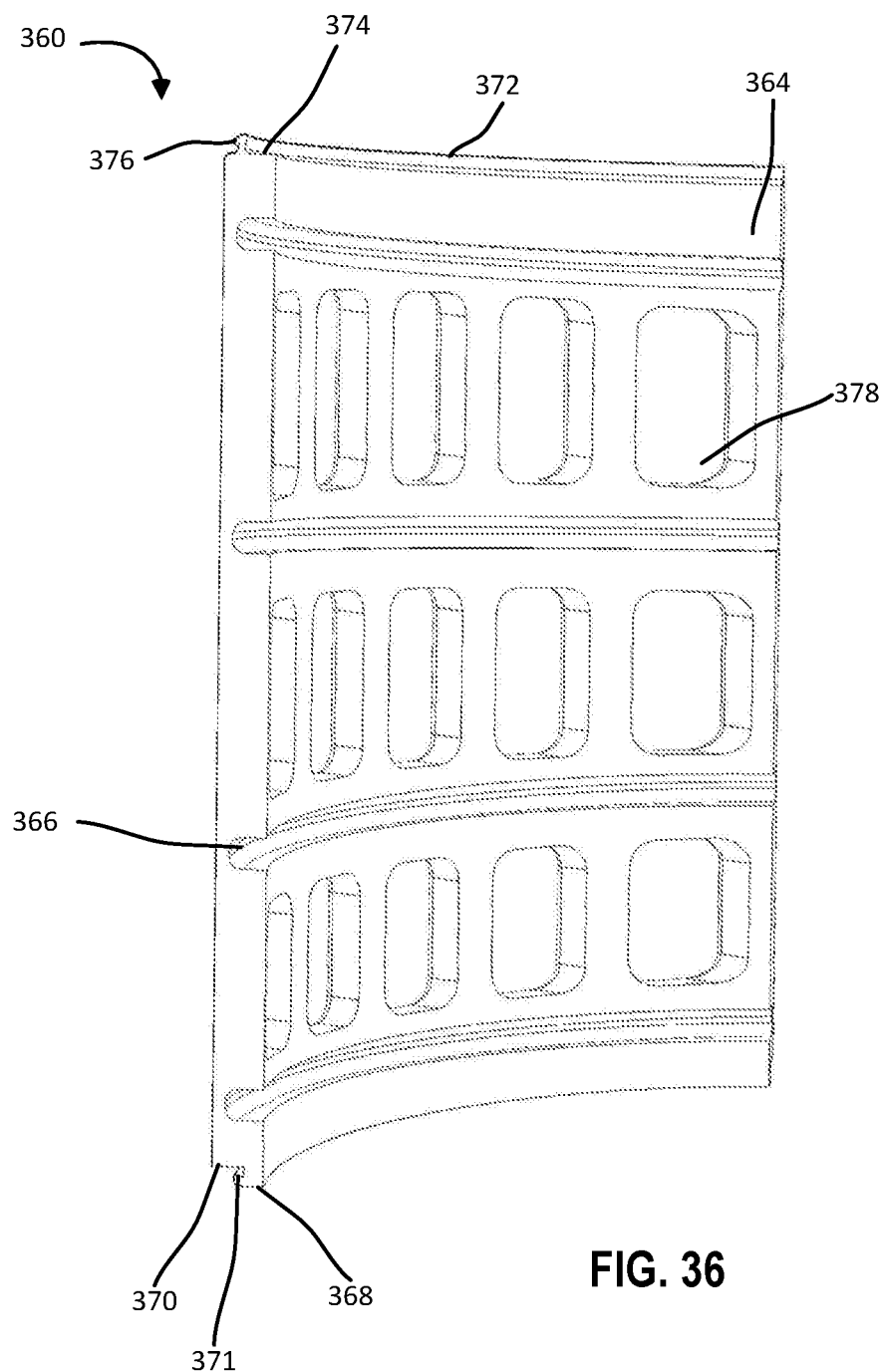
FIG. 36 illustrates a rear perspective view of the corner insert as disclosed herein.

A left corner insert 360A may extend from the front wall 303 to the left side wall 307 and a right corner insert 360B may extend from the front wall 303 to the right side wall 309. The corner insert 360 may have a length when measured in a direction oriented from the front end 302 to the rear end 304 of approximately 15 percent of the overall length of the bottom wall 311, or may have a length within a range of 10 percent to 20 percent of the overall length of the bottom wall 311. As shown in FIG. 36, each corner insert 360A, 360B may include an outward facing surface 362, an inward facing surface 364 opposite the outward facing surface 362. The inward facing surface 364 may have a plurality of grooves 366. The grooves 366 may receive a plurality of perimeter wires 350C that extend along the side walls 307, 309 and front wall 303. Each groove 366 may engage a single perimeter wire 350C of the plurality of wires arranged along the side walls 307, 309 and the front wall 303. The engagement between the grooves 366 and the wires 350C may help to secure the corner inserts 360 in a vertical orientation. Additionally, each corner insert 360 may have a lower engaging member 368 that extends from a lower surface 370 such that the engaging member 368 forms a lower undercut 371 between the lower surface 370 and the lower engaging member 368. The lower engaging member 368 may be received into the undercut 398 of the bottom insert 380 and the engaging member 395 of the bottom insert 380 may be received in undercut 371 to secure the bottom insert 380 to each corner insert 360. In some examples, these engaging members 368, 395 and corresponding undercuts 371, 398 may form a snap fit connection between each corner insert 360 and the bottom insert 380.

In addition, each corner insert 360 may have an upper engaging member 372 extending from an upper surface 374, where the upper engaging member 372 contacts an outer surface of the uppermost perimeter wire 350C of the wire basket portion 312. Engaging member 372 may also have a protrusion 376 that extends outwardly away from wire 350. The engaging member 372 and protrusion 376 may engage a lower undercut within recess 325 in the forward handle 314. The engaging member 372 and undercut may form a snap-fit connection between the forward handle 314 and each corner insert 360 to secure the corner insert 360 to the forward handle 314. As another feature, the outward facing surface 362 of each corner insert 360 may have a substantially rounded shape. These rounded corners may help to better nest the shopping carts together and further may improve durability as the lack of sharp corners may enhance the durability of the corner inserts 360. The outward facing surface 362 may have a variable radius where the radius of the rounded outward facing surface is within a range of 10 centimeters (cm) and 15 cm, or within a range of 8 cm and 18 cm. As another element, the corner inserts 360 may include a plurality of openings 378 that extend through the outward facing surface 362 and inward facing surface 364.

As discussed above, the wire basket portion 312 may include a plurality of individual wires oriented horizontally and vertically that cross at right angles to each other to form a wire mesh 313. The wire mesh 313 may form a portion of the front wall 303, side walls 307, 309, and bottom wall 311. In certain regions, the wire mesh 313 may have regions within the wire basket portion 312. For instance, the wire basket portion 312 may have a bottom wire mesh region 356 that forms a part of the bottom wall 311, and a central forward region 357 located in the forward region 354 of the wire basket portion 312. The central forward region 357 may only have wires 350B extending in a front-to-rear direction that extends from the front end 302 to the rear end 304 (i.e. the central forward region is free of wires extending from the left side 306 to the right side 308). The bottom insert 380 may attach via the rear tabs 394 to engage the forwardmost horizontal wire 350A of the bottom wire mesh region 356. This absence of the horizontal wires in the central forward region 357 allows the bottom insert 380 to form the forward corners of the bottom wall 311. In addition, the forward corner regions 359 of the wire basket portion 312 may only have perimeter wires 350C (i.e. wires that extend around the outer perimeter of the wire basket portion 312 from the left side wall 307 to the front wall 303 and from the front wall 303 to the right side wall 309.

Figure 24:
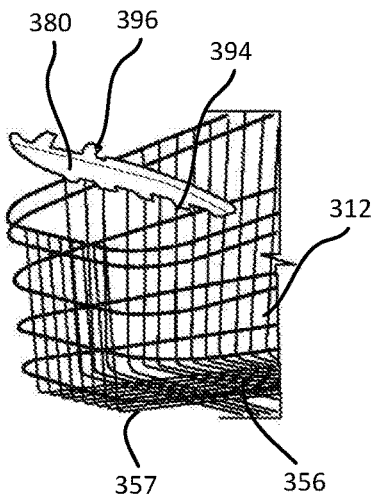
FIG. 24 illustrates a partial bottom front perspective view of the shopping cart basket of the embodiment shown in FIG. 15 as disclosed herein.
Figure 25:
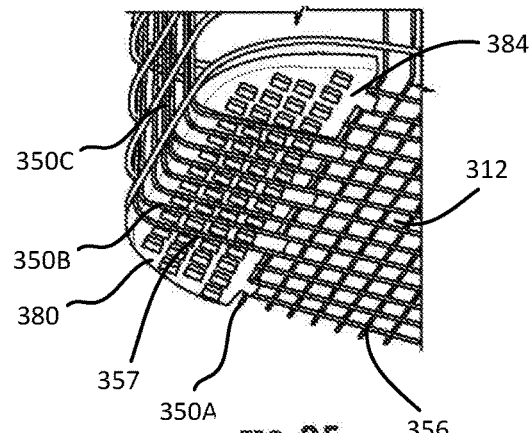
FIG. 25 illustrates a partial exploded top front perspective view of the shopping cart basket of the embodiment shown in FIG. 15 as disclosed herein.
Figure 26:
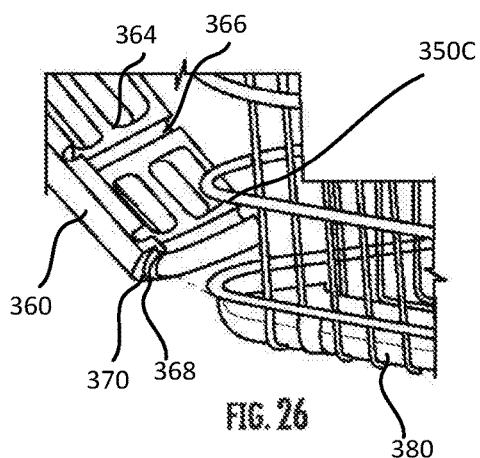
FIG. 26 illustrates a partial front perspective view of a partially assembled shopping cart basket of the embodiment shown in FIG. 15 as disclosed herein.
Figure 27:
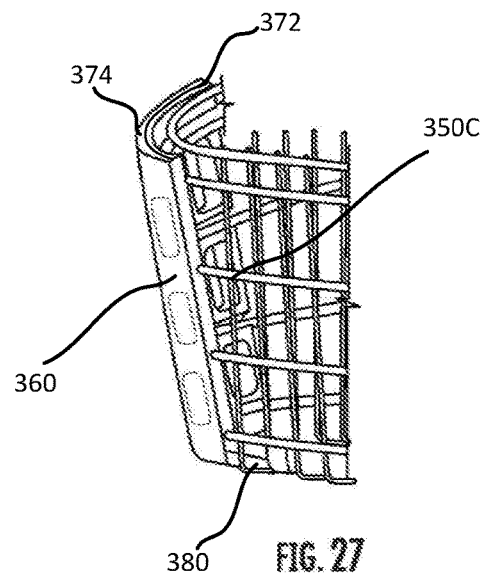
FIG. 27 illustrates a partial front perspective view of a partially assembled shopping cart basket of the embodiment shown in FIG. 15 as disclosed herein.
Figure 28:
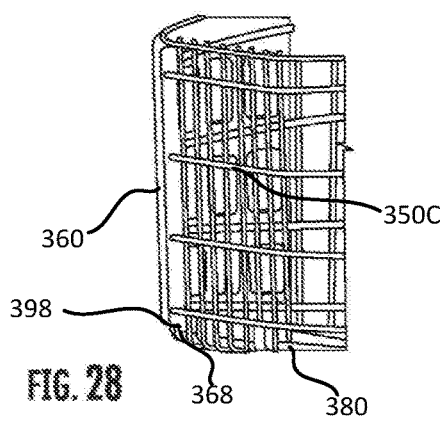
FIG. 28 illustrates a partial front perspective view of a partially assembled shopping cart basket of the embodiment shown in FIG. 15 as disclosed herein.
Figure 29:
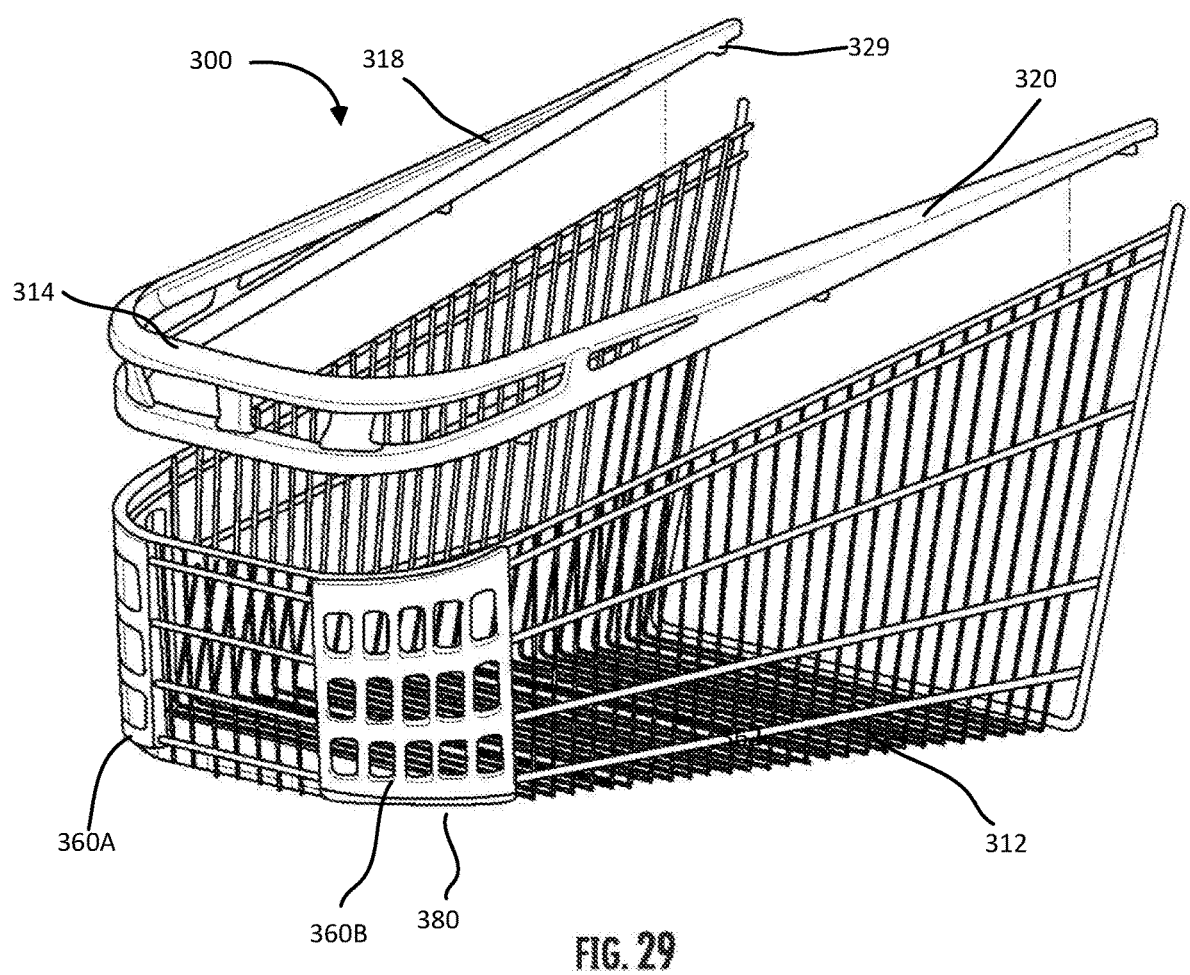
FIG. 29 illustrates a top front perspective view of a partially assembled shopping cart basket of the embodiment shown in FIG. 15 as disclosed herein.
Figure 30:
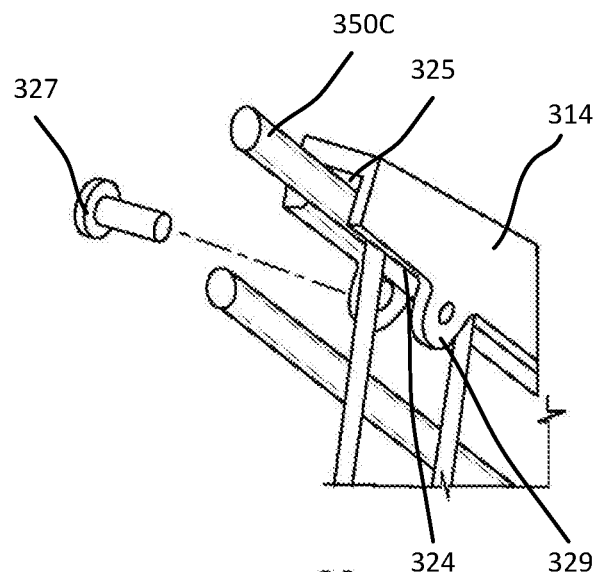
FIG. 30 illustrates an enlarged partial side perspective view of a partially assembled shopping cart basket of the embodiment shown in FIG. 15 as disclosed herein.
Figure 31:
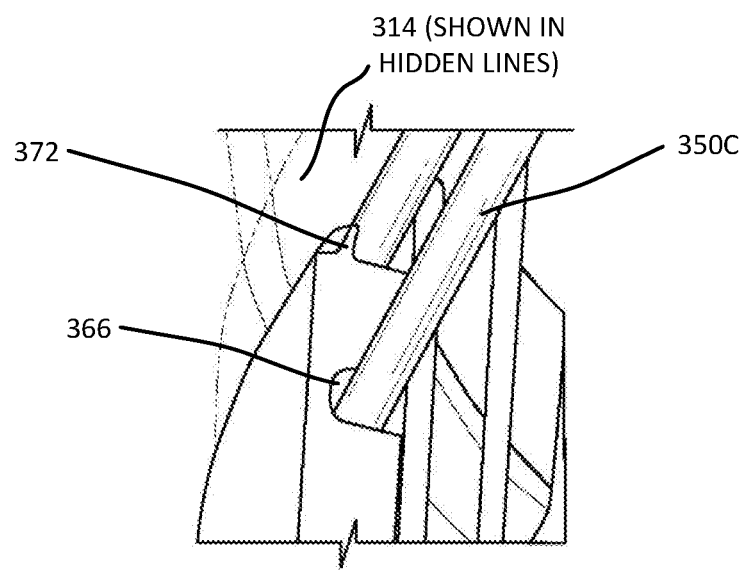
FIG. 31 illustrates an enlarged partial front perspective view of a partially assembled shopping cart basket of the embodiment shown in FIG. 15 as disclosed herein.
Figure 32:
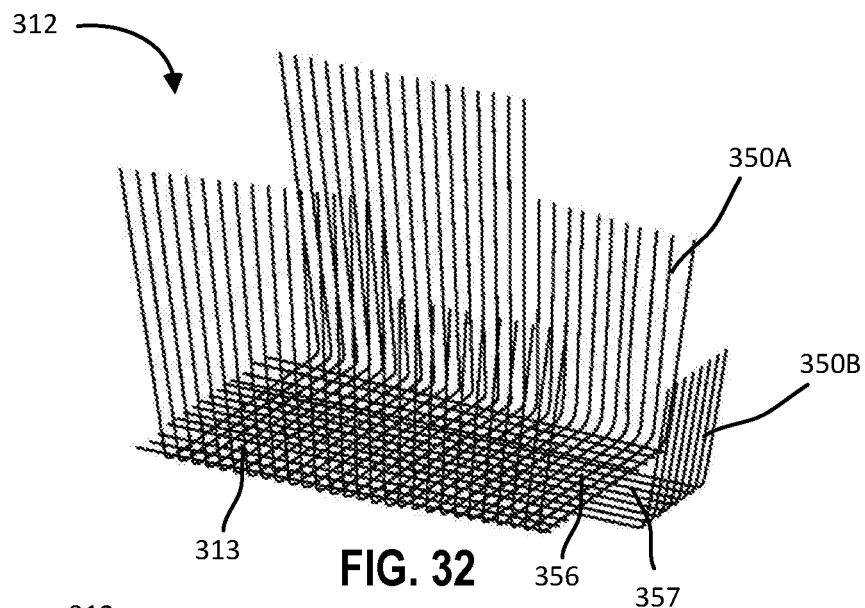
FIG. 32 illustrates a partially assembled wire basket portion of the shopping cart basket of the embodiment shown in FIG. 15 as disclosed herein.

FIGS. 23-32 illustrate the assembly of the shopping cart basket 300. To assemble shopping cart basket 300, first the bottom insert 380 may be inserted into the wire basket portion 312 from the top where a portion of the ledge 397 of the rear tabs 394 of the bottom insert 380 are inserted underneath the forwardmost wire 350A of the bottom wire mesh region 356 as shown in FIG. 24. The wire basket portion 312 may be prepared separately prior to assembling the corner inserts 360, bottom insert 380, forward handle 314 as will be discussed in more detail below. Next, the bottom insert 380 may be pressed down to engage the forward tabs 396 with the lowermost horizontal wire 350C along the front wall 303 as shown in FIG. 25. Once the bottom insert 380 is installed, each of the corner inserts 360 may be assembled by first engaging the lower engaging member 368 to the upper undercut and engaging member of the bottom insert 360 as shown in FIG. 26. When the engaging member 368 is contacting the upper undercut 398, the corner insert 360 may be rotated upward to receive the forward wires 350C into the grooves 366 until the upper engaging member 372 contacts an uppermost wire 350C along the front and side walls 303, 307, 309 as shown in FIGS. 27 and 28. Next, the recess 325 of the forward handle 314 is lowered onto the uppermost wire 350C. The upper engaging member 372 of the corner insert 360 is also received into the recess 325 in conjunction with the uppermost wire 350 as shown in FIGS. 29-31. The forward handle 314 may have a snap fit engagement over the upper engaging member 372 and the uppermost wire 350C. Lastly, a plurality of mechanical elements 327 (i.e. mechanical fasteners such as screws, rivets, dowels, or other releasable or permanent mechanical element) may be inserted into a plurality of tabs 329 that extend below from the inward and outward facing surfaces of arms 320 and main body portion 316 of the forward handle 314 as shown in FIG. 32.

Figure 33:
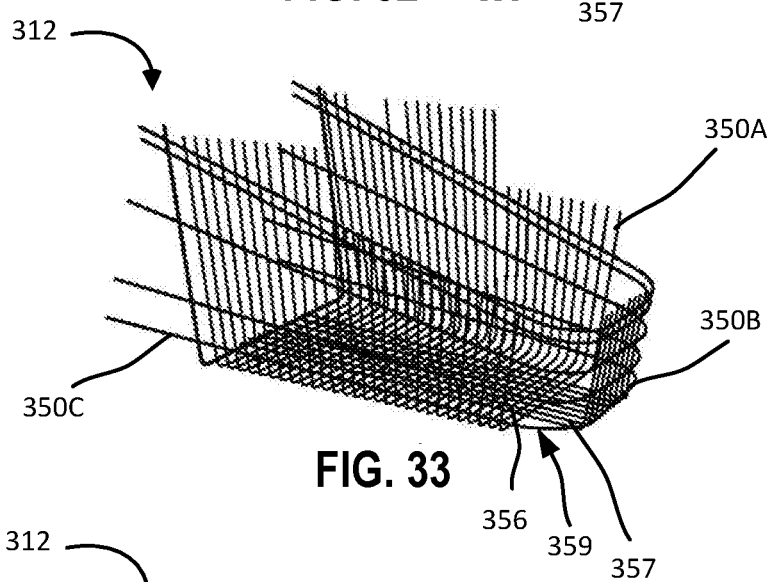
FIG. 33 illustrates a partially assembled wire basket portion of the shopping cart basket of the embodiment shown in FIG. 15 as disclosed herein.
Figure 34:
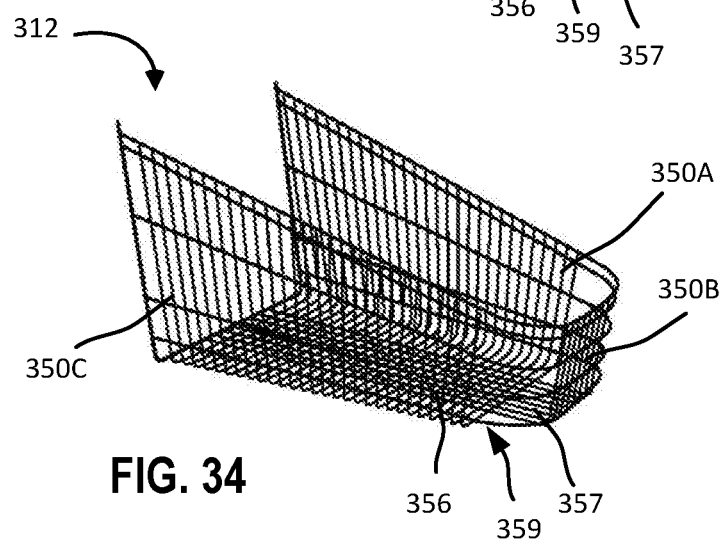
FIG. 34 illustrates a partially assembled wire basket portion of the shopping cart basket of the embodiment shown in FIG. 15 as disclosed herein.
Figure 35:
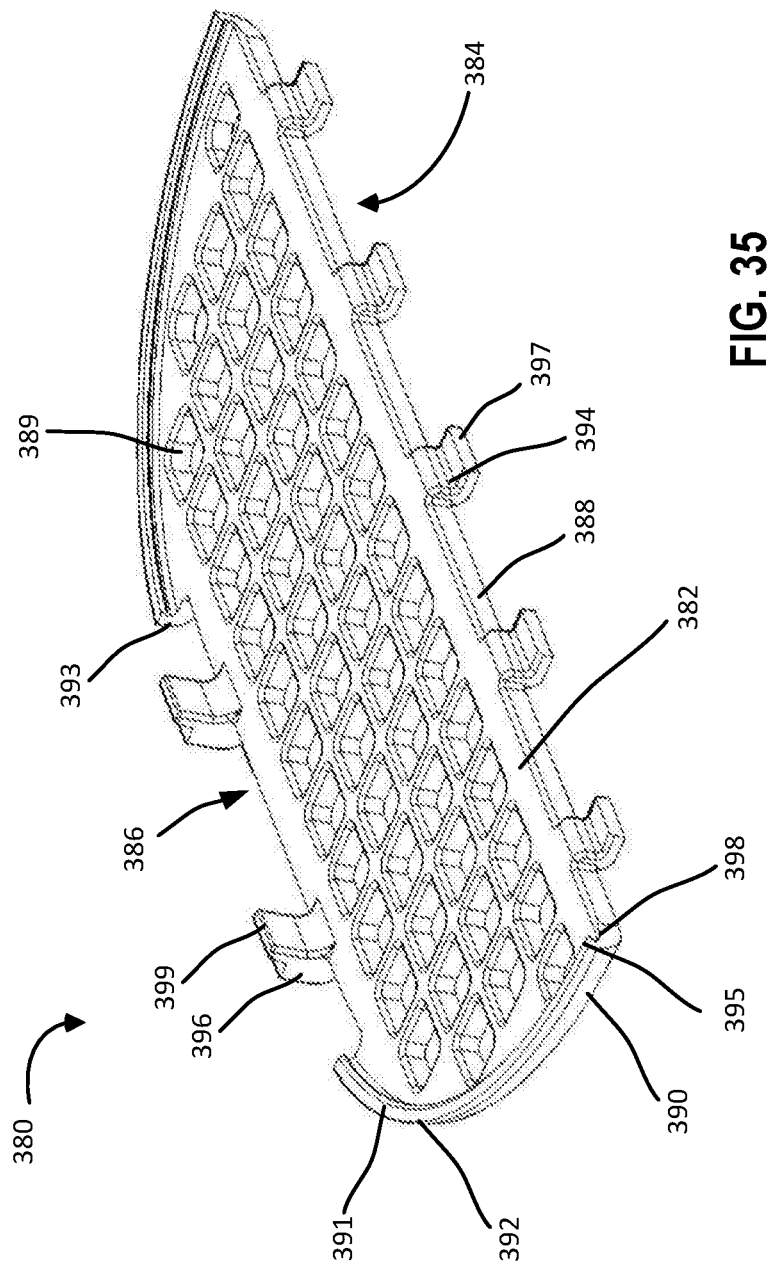
FIG. 35 illustrates a top rear perspective view of the bottom insert as disclosed herein.

FIGS. 33-35 illustrate the assembly of the wire basket portion 312. The wire basket portion 312 may include a plurality of individual wires 350A, 350B oriented horizontally and vertically that cross at right angles to each other to form a wire mesh 313. The wire mesh 313 may form the bottom wire mesh region 356, and in some examples, the wire mesh 313 may be formed as a flat sheet with regions where the horizontal and vertical wires extend without other wires crossing them. The wires 350 may then be formed to form the front and side wall members of the wire basket portion 312 where perimeter wires 350C may be attached to support the side walls 307, 309 and the front walls 303. Lastly, the wires extending above the uppermost perimeter wire 350C may be trimmed to form the wire basket portion 312.

Similar to the handle region 114 above, the forward handle 314, corner inserts 360, and bottom insert 380 may be formed of a polymer material, such as nylon, polycarbonate, or other rigid polymer. The polymer material may be fiber filled or unfilled. Further, the forward handle 314, corner inserts 360, and bottom insert 380 may be formed from a molding process such as injection or rotational molding.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A shopping cart comprising:
   a frame including a rear handle and a chassis connected to four casters,
   a shopping cart basket attached to the frame, wherein the shopping cart basket comprises a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall,
   wherein the shopping cart basket includes:
   a wire basket portion formed from a plurality of metallic wires that includes a bottom wire mesh region that forms a portion of the bottom wall and a central forward region located forward of the bottom wire mesh region that has only metallic wires extending in a front to rear direction,
   a forward handle positioned on an uppermost wire of the wire basket portion and forming an upper portion of the shopping cart basket along the front wall and a portion of the first and second side walls, and
   a bottom insert forming a forward region of the bottom wall that extends rearward from the front wall to the bottom wire mesh region, wherein a bottom surface of the bottom insert is located on top of the central forward region; and
   wherein the forward handle and the bottom insert are formed from a non-metallic material.

2. The shopping cart of claim 1, wherein the shopping cart basket further includes:
   a first corner insert that extends from the front wall to the first side wall, and
   a second corner insert that extends from the front wall to the second side wall, wherein the first corner insert and the second corner insert are formed from a non-metallic material.

3. The shopping cart of claim 1, wherein the forward handle includes a main body portion positioned along the front wall of the shopping cart basket, a first side arm that extends from the main body portion along the first side wall of the shopping cart basket, and a second side arm that extends from the main body portion along the second side wall of the shopping cart basket, and wherein the main body portion includes a pair of front openings.

4. The shopping cart of claim 1, wherein the forward handle includes a recess along a bottom surface of the forward handle that receives an uppermost wire of the wire basket portion.

5. The shopping cart of claim 2, wherein the first corner insert and the second corner insert extend from the bottom insert to the forward handle.

6. The shopping cart of claim 2, wherein the first corner insert has an outward facing surface that extends from the first side wall to the front wall, and wherein the outward facing surface has a rounded shape.

7. The shopping cart of claim 2, wherein the bottom insert includes a plurality of rear tabs that engage a forwardmost horizontal wire of the bottom wire mesh region.

8. The shopping cart of claim 2, wherein the bottom insert includes a front surface, a rear surface opposite the front surface, a top surface extending between the front surface to the rear surface, the bottom surface opposite the top surface, a pair of side surfaces, and a pair of corner surfaces, wherein a forwardmost edge of each corner surface is located forward of the front surface.

9. The shopping cart of claim 8, wherein the bottom insert has forward tabs extending from the front surface that engage a perimeter wire of the plurality of wires that form the wire basket portion, wherein the perimeter wire extends across the front wall of the plurality of wires that form the wire basket portion.

10. A shopping cart comprising:
a frame including a rear handle and a chassis connected to four casters,
a shopping cart basket attached to the frame, wherein the shopping cart basket comprises a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall,
wherein the shopping cart basket includes:
a wire basket portion formed from a plurality of metallic wires that includes a bottom wire mesh region that forms a portion of the bottom wall,
a forward handle positioned on an uppermost wire of the wire basket portion and forming an upper portion of the shopping cart basket along the front wall and a portion of the first and second side walls,
a first corner insert that extends from the front wall to the first side wall, and
a bottom insert forms a forward region of the bottom wall that extends rearward from the front wall to the bottom wire mesh region, and
the first corner insert engages the bottom insert at a first end and engages the forward handle at a second end opposite the first end, and
wherein the forward handle, the bottom insert, and the first corner insert are formed from a non-metallic material.

11. The shopping cart of claim 10, wherein the shopping cart basket further includes a second corner insert that extends from the front wall to the second side wall, and wherein the second corner insert are formed from a non-metallic material.

12. The shopping cart of claim 10, wherein the first corner insert has an outward facing surface and an inward facing surface opposite the outward facing surface, wherein the inward facing surface includes a plurality of grooves, wherein each groove of the plurality of grooves receives a perimeter wire of the plurality of wires that form the wire basket portion, wherein the perimeter wire extends across the front wall of the plurality of wires that form the wire basket portion.

13. The shopping cart of claim 10, wherein the first corner insert has an outward facing surface that extends from the first side wall to the front wall, and wherein the outward facing surface has a radius within a range of 8 centimeters and 18 centimeters.

14. A shopping cart comprising:
a frame including a rear handle and a chassis connected to four casters,
a shopping cart basket attached to the frame, wherein the shopping cart basket comprises a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall,
wherein the shopping cart basket includes:
a wire basket portion formed from a plurality of metallic wires that includes a bottom wire mesh region that forms a portion of the bottom wall,
a forward handle positioned on an uppermost wire of the wire basket portion and forming an upper portion of the shopping cart basket along the front wall and a portion of the first and second side walls, wherein the forward handle includes a main body portion positioned along the front wall of the shopping cart basket, a first side arm that extends from the main body portion along the first side wall of the shopping cart basket, and a second side arm that extends from the main body portion along the second side wall of the shopping cart basket, and wherein the main body portion includes a pair of front openings;
a first corner insert that extends from the front wall to the first side wall,
a second corner insert that extends from the front wall to the second side wall,
a bottom insert forming a forward region of the bottom wall that extends rearward from the front wall to the bottom wire mesh region;
wherein the bottom insert includes a plurality of rear tabs that engage a forwardmost horizontal wire of the bottom wire mesh region; and
wherein the forward handle, the first corner insert, the second corner insert, and the bottom insert are formed from a non-metallic material.

15. The shopping cart of claim 14, wherein the first corner insert engages the bottom insert at a first end and engages the forward handle at a second end opposite the first end.

16. The shopping cart of claim 14, wherein the bottom insert includes a front surface, a rear surface opposite the front surface, a top surface extending between the front surface to the rear surface, a bottom surface opposite the top surface, a pair of side surfaces, and a pair of corner surfaces, wherein a forwardmost edge of each corner surface is located forward of the front surface.

17. The shopping cart of claim 1, wherein the bottom insert has a length within a range of 10 percent and 20 percent of a length of the bottom wall, wherein the length is measured in a direction from the front end to the rear end of the shopping cart basket.

18. The shopping cart of claim 1, wherein the bottom insert has a top surface that is substantially planar with a plane defined by a top of the bottom wire mesh region.

* * * * *